United States Patent
Pan et al.

(10) Patent No.: US 12,221,001 B2
(45) Date of Patent: Feb. 11, 2025

(54) ENERGY CONVERSION DEVICE AND VEHICLE

(71) Applicant: BYD COMPANY LIMITED, Guangdong (CN)

(72) Inventors: Hua Pan, Shenzhen (CN); Jicheng Li, Shenzhen (CN); Feiyue Xie, Shenzhen (CN); Yuxin Zhang, Shenzhen (CN); Ning Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 567 days.

(21) Appl. No.: 17/763,916

(22) PCT Filed: Aug. 18, 2020

(86) PCT No.: PCT/CN2020/109884
§ 371 (c)(1),
(2) Date: Mar. 25, 2022

(87) PCT Pub. No.: WO2021/057338
PCT Pub. Date: Apr. 1, 2021

(65) Prior Publication Data
US 2022/0348094 A1   Nov. 3, 2022

(30) Foreign Application Priority Data
Sep. 25, 2019   (CN) .......................... 201910912681.1

(51) Int. Cl.
*B60L 53/24*   (2019.01)
*B60H 1/00*   (2006.01)
(Continued)

(52) U.S. Cl.
CPC .......... *B60L 53/24* (2019.02); *B60H 1/00278* (2013.01); *B60L 58/26* (2019.02);
(Continued)

(58) Field of Classification Search
CPC .......... B60L 53/24; B60L 58/26; B60L 58/27; B60L 2220/54; B60L 2210/10;
(Continued)

(56) References Cited

U.S. PATENT DOCUMENTS 8,659,182 B2 * 2/2014 Ichikawa ................ B60L 53/24
320/104
2014/0217973 A1   8/2014 Lee et al.
2019/0202310 A1   7/2019 Gebhart

FOREIGN PATENT DOCUMENTS

CN   101454958 A   6/2009
CN   101459344 A   6/2009
(Continued)

OTHER PUBLICATIONS

International Search Report and Written Opinion for Application No. PCT/CN2020/109884, mailed on Nov. 19, 2020, 11 pages.

*Primary Examiner* — Paul Dinh
(74) *Attorney, Agent, or Firm* — Krystle Siersema

(57) ABSTRACT

An energy conversion device is provided. The device includes: a reversible pulse width modulation (PWM) rectifier (11) and a motor coil (12), where the motor coil (12) includes at least a first winding unit and a second winding unit, and the first winding unit and the second winding unit are both connected with the reversible PWM rectifier (11). The first winding unit is connected with at least one of neutral lines in the second winding unit, where at least one neutral line of at least one of the winding units is connected with a first end of a first direct current (DC) charging and discharging port (3), the reversible PWM rectifier (11) is connected with a first end of a external battery (2) and a second end of the external battery (2) respectively, and a second end of the first DC charging and discharging port (3) is connected with the second end of the external battery (2).

20 Claims, 22 Drawing Sheets

(51) Int. Cl.
*B60L 58/26* (2019.01)
*B60L 58/27* (2019.01)
*B60R 16/033* (2006.01)
*H02M 7/797* (2006.01)
*H02P 25/22* (2006.01)
*H02J 7/14* (2006.01)
*H02P 27/06* (2006.01)

(52) U.S. Cl.
CPC ............ *B60L 58/27* (2019.02); *B60R 16/033* (2013.01); *H02M 7/797* (2013.01); *H02P 25/22* (2013.01); *B60L 2220/54* (2013.01); *B60Y 2200/91* (2013.01); *H02J 7/14* (2013.01); *H02J 2207/20* (2020.01); *H02P 27/06* (2013.01)

(58) Field of Classification Search
CPC ................ B60L 1/006; B60L 2220/58; B60L 2240/429; B60L 2240/662; B60L 53/11; B60L 53/20; B60L 53/22; B60H 1/00278; B60H 1/00271; B60R 16/033; H02M 7/797; H02M 1/0064; H02M 3/1552; H02P 25/22; H02P 27/06; B60Y 2200/91; H02J 7/14; H02J 2207/20; Y02T 10/70; Y02T 10/7072; Y02T 90/14

USPC ........................................................ 320/127
See application file for complete search history.

(56) References Cited

FOREIGN PATENT DOCUMENTS

| | | |
|---|---|---|
| CN | 102015355 A | 4/2011 |
| CN | 203275601 U | 11/2013 |
| CN | 103419656 B | 3/2016 |
| CN | 105762434 A | 7/2016 |
| CN | 108306078 A | 7/2018 |
| CN | 108539833 A | 9/2018 |
| CN | 109789799 A | 5/2019 |
| DE | 102011017369 A1 | 10/2012 |
| EP | 2062801 A1 | 5/2009 |
| EP | 2559587 A2 | 2/2013 |
| JP | H08126121 A | 5/1996 |
| JP | H11-308704 A | 11/1999 |
| JP | 2010-051092 A | 3/2010 |
| KR | 20190021891 A | 3/2019 |
| WO | 2016129338 A1 | 12/2017 |

* cited by examiner

ENERGY CONVERSION DEVICE AND VEHICLE

CROSS-REFERENCE TO RELATED APPLICATIONS

This application is a National Phase Application of International Patent Application No. PCT/CN2020/109884, filed on Aug. 18, 2020, which is based on and claims priority to and benefits of Chinese Patent Application No. 201910912681.1, entitled "ENERGY CONVERSION APPARATUS AND VEHICLE" and filed on Sep. 25, 2019. The entire content of all of the above identified applications is incorporated herein by reference.

FIELD

This application relates to the field of electronic technologies, and in particular, to an energy conversion device and a vehicle.

BACKGROUND

With the popularization of electric vehicles, more and more electric vehicles will be available for the society and family. However, due to mileage limit of pure electric vehicles, vehicle users are quite concerned about a problem that a vehicle breaks down due to exhaustion of a power supply. Although many vehicle manufacturing companies remind a vehicle driver of remaining battery level information and excessive low battery level alarm information by using a vehicle's instrument or another method, occurrence of a case that the remaining battery level of the vehicle cannot allow the vehicle to drive to a charging facility or the driver did not notice that the vehicle runs out of power may be inevitable.

To prevent the problem from affecting use experience of the pure electric vehicles for the vehicle users or even affecting use and promotion of the pure electric vehicles, it is necessary to develop a technology of using a mobile charging device to charge vehicles, to meet a requirement of supplying power to a vehicle in a case that the vehicle runs out of the battery level or a vehicle energy storage device no long outputs energy due to a low battery level.

SUMMARY

This application is intended to resolve one of technical problems in the related art at least to some extent.

Embodiments of this application provide an energy conversion device and a vehicle, to discharge a power consuming device and receive a power supply device for charging.

A first embodiment of this application provides an energy conversion device, including:

a reversible pulse width modulation (PWM) rectifier and a motor coil, wherein the motor coil includes at least a first winding unit and a second winding unit, and the first winding unit and the second winding unit are both connected with the reversible PWM rectifier; and wherein an external battery, the reversible PWM rectifier, the motor coil, and an external first direct current (DC) charging and discharging port form a DC charging circuit or a DC discharging circuit; and the first winding unit leads out at least one neutral line, the second winding unit leads out at least one neutral line, and the first winding unit is connected with at least one of the neutral line of the second winding unit, wherein at least one neutral line of at least one of winding units is connected with a first end of the external first DC charging and discharging port, the reversible PWM rectifier is connected with a first end of the external battery and a second end of the external battery, respectively, and a second end of the external first DC charging and discharging port is connected with the second end of the external battery.

A second embodiment of this application provides an energy conversion device, including:

a motor coil, including at least a first winding unit and a second winding unit, where the first winding unit leads out at least one neutral line, the second winding unit leads out at least one neutral line, and the first winding unit is connected with at least one of the neutral line in the second winding unit;

a reversible pulse width modulation (PWM) rectifier, connected with the first winding unit and the second winding unit respectively;

a charging and discharging connection end group, including a first charging and discharging connection end and a second charging and discharging connection end, where at least one neutral line of the at least one winding unit in the motor coil is connected with the first charging and discharging connection end, and the second charging and discharging connection end is connected with a second bus terminal of the reversible PWM rectifier; and an energy storage connection end group, including a first energy storage connection end and a second energy storage connection end, where the first energy storage connection end is connected with a first bus terminal of the reversible PWM rectifier, and the second energy storage connection end is connected with the second bus terminal of the reversible PWM rectifier.

A third embodiment of this application provides a vehicle, including the energy conversion device provided in the first embodiment of this application or the energy conversion device provided in the second embodiment of this application.

This application provides an energy conversion device and a vehicle. With the energy conversion device including a reversible PWM rectifier and a motor coil, after the energy conversion device is connected with an external battery and a first DC charging and discharging port, the energy conversion device can work in a DC charging mode, a DC discharging mode, and a driving mode. When the energy conversion device works in the driving mode, the external battery, the reversible PWM rectifier, and the motor coil form a driving circuit. When the energy conversion device works in the DC charging mode, the external first DC charging and discharging port is connected to the external battery through the energy conversion device to form a DC charging circuit. When the energy conversion device works in the DC discharging mode, the external battery forms a DC discharging circuit with the energy conversion device and the external first DC charging and discharging port. A motor is driven to output power by a driving circuit, and discharging outward or reception for charging is implemented by using the DC discharging circuit or the DC charging circuit, so that charging from a DC power supply device when the battery level of the external battery is insufficient and discharging to a DC power consuming device when the battery level of the external battery is sufficient are implemented, and the driving circuit, a heating circuit, the DC charging circuit, and the DC discharging circuit all use the reversible PWM rectifier and the motor coil. In this way, not only the circuit structure is simplified, but also the degree of integration is improved, thereby reducing the volume and costs, and resolving the problems of a complex structure, a low degree of integration, a large volume, and high costs of an existing entire control circuit including a battery charging circuit and a motor driving circuit.

Other aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description of the embodiments made with reference to the following accompanying drawings.

DETAILED DESCRIPTION

Figure 1:
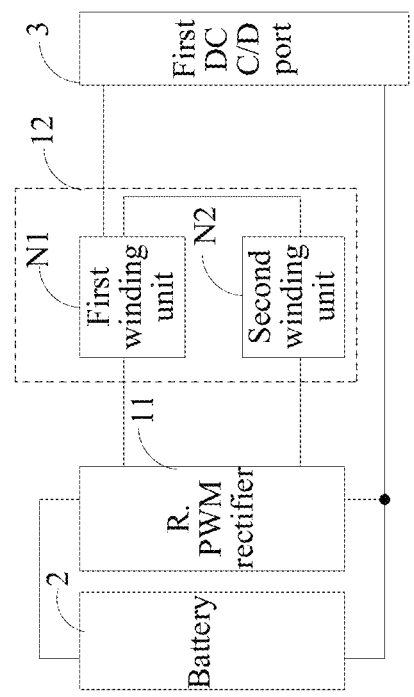
FIG. 1 is a schematic structural diagram of modules of an energy conversion device according to a first embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, and are intended to explain this application and cannot be construed as a limitation to this application.

To describe technical solutions in this application, the following will be described by using specific embodiments.

A first embodiment of this application provides an energy conversion device. As shown in FIG. 1, the energy conversion device includes a reversible pulse width modulation (PWM) rectifier 11 and a motor coil 12.

Specifically, the motor coil 12 includes at least a first winding unit N1 and a second winding unit N2, and the first winding unit N1 and the second winding unit N2 are both connected with the reversible PWM rectifier 11; and the first winding unit N1 leads out at least one neutral line, the second winding unit N2 leads out at least one neutral line, and the first winding unit N1 is connected with at least one of the neutral lines in the second winding unit N2. At least one neutral line in at least one of the winding units is connected with a first end of a first direct current (DC) charging and discharging port 3, the reversible PWM rectifier 11 is connected with a first end of a battery 2 and a second end of the battery 2 respectively, and a second end of the first DC charging and discharging port 3 is connected with the second end of the battery 2.

In this embodiment, the first end of the first DC charging and discharging port 3 may be connected with the first winding unit N1 or may be connected with the second winding unit N2.

It should be noted that, the "charging and discharging" mentioned in this embodiment refers to "charging" or "discharging", so that a "charging and discharging port" may be a "charging port" or a "discharging port", and a "charging and discharging circuit" may be a "charging circuit" or a "discharging circuit".

In addition, an "external power supply" described in this embodiment is "external" relative to the energy conversion device rather than "external" relative to a vehicle in which the energy conversion device is located.

In this embodiment, when the first DC charging and discharging port 3 outputs a direct current, the first DC charging and discharging port 3 needs to be already connected with a DC power supply device; and when a direct current is inputted into the first DC charging and discharging port 3, the first DC charging and discharging port 3 needs to be already connected with a DC power consuming device. Therefore, in the following description, when the first DC charging and discharging port 3 outputs a direct current, the first DC charging and discharging port is already connected with a DC power supply device; and when a direct current is inputted into the first DC charging and discharging port 3, the first DC charging and discharging port is already connected with a DC power consuming device.

The reversible PWM rectifier 11 may, according to a control signal, perform inversion on a current inputted by the battery 2 or rectify a current inputted into the battery 2. The reversible PWM rectifier 11 includes multiple phase bridge arms, and the number of bridge arms is configured according to the number of phases of the motor coil 12. Each phase inverter bridge arm includes two power switch units, the power switch unit may be a transistor, an insulated gate bipolar transistor (IGBT), a metal-oxide-semiconductor (MOS) transistor, silicon carbide, or another component type, and a connection point of two power switch units in the bridge arms is connected with windings of one phase in a motor. The power switch units in the reversible PWM rectifier 11 can implement switch-on or switch-off according to an external control signal, to convert a direct current inputted by the battery 2 into an alternating current.

The motor coil 12 includes at least two winding units, and each winding unit includes multiple phase windings. Each phase winding includes N coil branches, first ends of the N coil branches in each phase winding are connected jointly to form a phase endpoint, and second ends of the N coil branches in each phase winding are connected with second ends of N coil branches in windings of another phase in a one-to-one correspondence, to form N connection points, where N is an integer greater than or equal to 1.

The first winding unit N1 may alternatively be a coil of neutral points formed by two or more connection points, the second winding unit N2 may alternatively be a coil of neutral points formed by two or more connection points, and the connection points forming the first winding unit N1 and the connection points forming the second winding unit N2 are different connection points, namely, the first winding unit N1 and the second winding unit N2 include different neutral points.

The first winding unit N1 includes at least two phase endpoints and at least one neutral point, and at least one neutral line is led out from the at least one neutral point respectively; and the second winding unit N2 includes at least two phase endpoints and at least one neutral point, at least one neutral line is led out from the at least one neutral point respectively, the second winding unit N2 is connected with the first winding unit N1 through the at least one neutral line, and the first winding unit N1 and the second winding unit N2 may be both connected with the reversible PWM rectifier 11 through phase endpoints.

In this embodiment, at least one neutral line may be led out from one neutral point, or one neutral line may be led out from a plurality of neutral points respectively. Meanwhile, the first winding unit N1 and the second winding unit N2 may be connected through neutral lines outside the motor, or may be connected through neutral lines inside the motor, which is not specifically limited herein.

It should be noted that, the first winding unit N1 and the second winding unit N2 may be located in motor coils 12 of different motors or may be located in a motor coil 12 of the same motor. That is, when the first winding unit N1 is located in a motor coil 12 of one motor, the second winding unit N2 may be located in a motor coil 12 of another motor; or the first winding unit N1 and the second winding unit N2 are located in a motor coil 12 of the same motor. Meanwhile, all phase windings of each winding unit are used as a basic unit, and using motor vector control for each basic unit can control the motor operation independently.

In addition, the energy conversion device further includes a control module, and the control module is connected with the reversible PWM rectifier 11 and may send a control signal to the reversible PWM rectifier 11. The control module may include a vehicle control unit, a control circuit of the reversible PWM rectifier 11, and a battery management system (BMS) circuit, the three components are connected through controller area network (CAN) lines, and different modules in the control module control switch-on or switch-off of power switches in the reversible PWM rectifier 11 according to obtained information to implement switch-on of different current circuits.

The energy conversion device can work in a DC charging mode, a DC discharging mode, or a driving mode.

When the energy conversion device works in the DC charging mode, the first DC charging and discharging port 3 outputs a direct current, to charge the battery 2 after the direct current flows through the first winding unit N1, the second winding unit N2, and the reversible PWM rectifier 11; or the first DC charging and discharging port 2 outputs a direct current, to charge the battery 2 after the direct current flows through the first winding unit N1 and the reversible PWM rectifier 11; or the first DC charging and discharging port 2 outputs a direct current, to charge the battery 2 after the direct current flows through the second winding unit N2 and the reversible PWM rectifier 11.

When the energy conversion device works in the DC discharging mode, the battery 2 outputs a direct current, to charge the first DC charging and discharging port 3 after the direct current flows through the reversible PWM rectifier 11, the second winding unit N2, and the first winding unit N1; or the battery 2 outputs a direct current, to charge the first DC charging and discharging port 3 after the direct current flows through the reversible PWM rectifier 11 and the first winding unit N1; or the battery 2 outputs a direct current, to charge the first DC charging and discharging port 3 after the direct current flows through the reversible PWM rectifier 11 and the second winding unit N2.

When the energy conversion device works in the driving mode, the battery 2 provides a direct current to the reversible PWM rectifier 11, and the reversible PWM rectifier 11 inverts the direct current into a multi-phase alternating current and inputs the multi-phase alternating current into the motor coil 12 to drive the motor to operate.

In this embodiment, an energy conversion device including a reversible PWM rectifier 11 and a motor coil 12 is used, and after the energy conversion device is connected with an external battery 2 and a first DC charging and discharging port 3, the energy conversion device can work in a DC charging mode, a DC discharging mode, and a driving mode. When the energy conversion device works in the driving mode, the external battery 2, the reversible PWM rectifier 11, and the motor coil 12 form a driving circuit. When the energy conversion device works in the DC charging mode, the external first DC charging and discharging port 3 forms a DC charging circuit with the energy conversion device and the external battery 2. When the energy conversion device works in the DC discharging mode, the external battery 2 forms a DC discharging circuit with the energy conversion device and the external first DC charging and discharging port 3. A motor is driven to output power by a driving circuit, and discharging or receiving charges is implemented by using the DC discharging circuit or the DC charging circuit, so that charging from a DC power supply device when the battery level of the external battery 2 is insufficient and discharging to a DC power consuming device when the battery level of the external battery 2 is sufficient are implemented, and the driving circuit, a heating circuit, the DC charging circuit, and the DC discharging circuit all use the reversible PWM rectifier 11 and the motor coil 12. In this way, not only the circuit structure is simplified, but also the degree of integration is improved, thereby reducing the volume and costs, and resolving the problems of a complex structure, a low degree of integration, a large volume, and high costs of an existing entire control circuit including a battery 2 charging circuit and a motor driving circuit.

Further, as an implementation of this embodiment, the first DC charging and discharging port 3 may be connected with a DC power supply device or may be connected with a DC power consuming device.

When the first DC charging and discharging port 3 is connected with a DC power supply device, the DC power supply device supplies power to the energy conversion device. In this case, the DC power supply device, the first DC charging and discharging port 3, the first winding unit N1, the second winding unit N2, the reversible PWM rectifier 11, and the battery 2 form a DC charging circuit. The DC power supply device, the first DC charging and discharging port 3, the first winding unit N1, the second winding unit N2, and the reversible PWM rectifier 11 form a DC charging and storing circuit, and the DC power supply device, the first DC charging and discharging port 3, the first winding unit N1, the second winding unit N2, the reversible PWM rectifier 11, and the battery 2 form a DC charging and releasing circuit.

In the foregoing DC charging and storing circuit, the first winding unit N1 and the second winding unit N2 complete energy storage, and in the foregoing DC charging and releasing circuit, the first winding unit N1 and the second winding unit N2 complete stored energy releasing, so that the reversible PWM rectifier 11 outputs a boosted direct current, to charge the battery 2.

In addition, the DC power supply device, the first DC charging and discharging port 3, the first winding unit N1, the reversible PWM rectifier 11, and the battery 2 form a DC charging circuit. The DC power supply device, the first DC charging and discharging port 3, the first winding unit N1, and the reversible PWM rectifier 11 form a DC charging and storing circuit, and the DC power supply device, the first DC charging and discharging port 3, the first winding unit N1, the reversible PWM rectifier 11, and the battery 2 form a DC charging and releasing circuit.

In the foregoing DC charging and storing circuit, the first winding unit N1 completes energy storage, and in the foregoing DC charging and releasing circuit, the first winding unit N1 completes stored energy releasing, so that the reversible PWM rectifier 11 outputs a boosted direct current, to charge the battery 2.

In addition, the DC power supply device, the first DC charging and discharging port 3, the second winding unit N2, the reversible PWM rectifier 11, and the battery 2 form a DC charging circuit. The DC power supply device, the first DC charging and discharging port 3, the second winding unit N2, and the reversible PWM rectifier 11 form a DC charging and storing circuit, and the DC power supply device, the first DC charging and discharging port 3, the second winding unit N2, the reversible PWM rectifier 11, and the battery 2 form a DC charging and releasing circuit.

In the foregoing DC charging and storing circuit, the second winding unit N2 completes energy storage, and in the foregoing DC charging and releasing circuit, the second winding unit N2 completes stored energy releasing, so that the reversible PWM rectifier 11 outputs a boosted direct current, to charge the battery 2.

When the first DC charging and discharging port 3 is connected with a DC power consuming device, the energy conversion device supplies power to the DC power consuming device. In this case, the battery 2, the reversible PWM rectifier 11, the second winding unit N2, the first winding unit N1, the first DC charging and discharging port 3, and the DC power consuming device form a DC discharging circuit. The battery 2, the reversible PWM rectifier 11, the second winding unit N2, the first winding unit N1, the first DC charging and discharging port 3, and the DC power consuming device form a DC discharging and storing circuit, and the reversible PWM rectifier 11, the second winding unit N2, the first winding unit N1, the first DC charging and discharging port 3, and the DC power consuming device form a DC discharging and releasing circuit.

In the foregoing DC discharging and storing circuit, the first winding unit N1 and the second winding unit N2 complete energy storage, and in the foregoing DC discharging and releasing circuit, the first winding unit N1 and the second winding unit N2 complete stored energy releasing, so that the first winding unit N1 and the second winding unit N2 output a bucked direct current, to charge the DC power consuming device.

In addition, the battery 2, the reversible PWM rectifier 11, the first winding unit N1, the first DC charging and discharging port 3, and the DC power consuming device form a DC discharging circuit. The battery 2, the reversible PWM rectifier 11, the first winding unit N1, the first DC charging and discharging port 3, and the DC power consuming device form a DC discharging and storing circuit, and the reversible PWM rectifier 11, the first winding unit N1, the first DC charging and discharging port 3, and the DC power consuming device form a DC discharging and releasing loop.

In the foregoing DC discharging and storing circuit, the first winding unit N1 completes energy storage, and in the foregoing DC discharging and releasing circuit, the first winding unit N1 completes stored energy releasing, so that the first winding unit N1 outputs a bucked direct current, to charge the DC power consuming device.

In addition, the battery 2, the reversible PWM rectifier 11, the second winding unit N2, the first DC charging and discharging port 3, and the DC power consuming device form a DC discharging circuit. The battery 2, the reversible PWM rectifier 11, the second winding unit N2, the first DC charging and discharging port 3, and the DC power consuming device form a DC discharging and storing circuit, and the reversible PWM rectifier 11, the second winding unit N2, the first DC charging and discharging port 3, and the DC power consuming device form a DC discharging and releasing circuit.

In the foregoing DC discharging and storing circuit, the second winding unit N2 completes energy storage, and in the foregoing DC discharging and releasing circuit, the second winding unit N2 completes stored energy releasing, so that the second winding unit N2 outputs a bucked direct current, to supply power to the DC power consuming device.

In this implementation, a switch-on or switch-off state of each power switch in the reversible PWM rectifier 11 is controlled, to enable the motor coil 12 to complete an energy storage or energy releasing process, so that DC charging or DC discharging of the energy conversion device is implemented, and the motor coil 12 is reused in a DC charging circuit or a DC discharging circuit to implement DC charging or DC discharging.

Further, as an implementation of this embodiment, the reversible PWM rectifier 11 includes one set of M phase bridge arms, first ends of each phase bridge arm are connected jointly to form a first bus terminal, second ends of each phase bridge arm are connected jointly to form a second bus terminal, the first bus terminal is connected with the first end of the battery 2, and the second bus terminal is connected with the second end of the battery 2 and the second end of the first DC charging and discharging port 3.

The motor coil 12 includes at least a first winding unit N1 and a second winding unit N2, the first winding unit N1 includes one set of $m_1$ phase windings, and each phase winding in the $m_1$ phase windings includes $n_1$ coil branches. The $n_1$ coil branches of each phase winding are connected jointly to form a phase endpoint, phase endpoints of the $m_1$ phase windings are connected with midpoints of each phase bridge arm of $m_1$ phase bridge arms in the M phase bridge arms in a one-to-one correspondence, and one coil branch in the $n_1$ coil branches of each phase winding in the $m_1$ phase windings is further connected with one coil branch in the $n_1$ coil branches of other phase windings respectively, to form $n_1$ connection points. $T_1$ neutral points are formed from the $n_1$ connection points, and $J_1$ neutral lines are led out from the $T_1$ neutral points, where $n_1 \geq T_1 \geq 1$, $T_1 \geq J_1 \geq 1$, $m_1 \geq 2$, and $n_1$, $m_1$, $T_1$, and $J_1$ are all positive integers.

The second winding unit N2 includes one set of $m_2$ phase windings, and each phase winding in the $m_2$ phase windings includes $n_2$ coil branches. The $n_2$ coil branches of each phase winding are connected jointly to form a phase endpoint, phase endpoints of the $m_2$ phase windings are connected with midpoints of each phase bridge arm of $m_2$ phase bridge arms in the M phase bridge arms in a one-to-one correspondence, and one coil branch in the $n_2$ coil branches of each phase winding in the $m_2$ phase windings is further connected with one coil branch in the $n_2$ coil branches of other phase windings respectively, to form $n_2$ connection points. $T_2$ neutral points are formed from the $n_2$ connection points, and $J_2$ neutral lines are led out from the $T_2$ neutral points, where $n_2 \geq T_2 \geq 1$, $T_2 \geq J_2 \geq 1$, $m_2 \geq 2$, $M \geq m_1 + m_2$, and $n_2$, $m_2$, $T_2$, and $J_2$ are all positive integers.

At least one neutral line in the $J_1$ neutral lines is connected with at least one neutral line in the $J_2$ neutral lines, and at least one neutral line in the $J_1$ neutral lines and/or at least one neutral line in the $J_2$ neutral lines is connected with the first end of the first DC charging and discharging port 3.

It should be noted that, all phase windings of each winding unit are used as a basic unit, and motor vector control over is performed on each basic unit, so that each basic unit may independently control a motor to operate.

Figure 2:
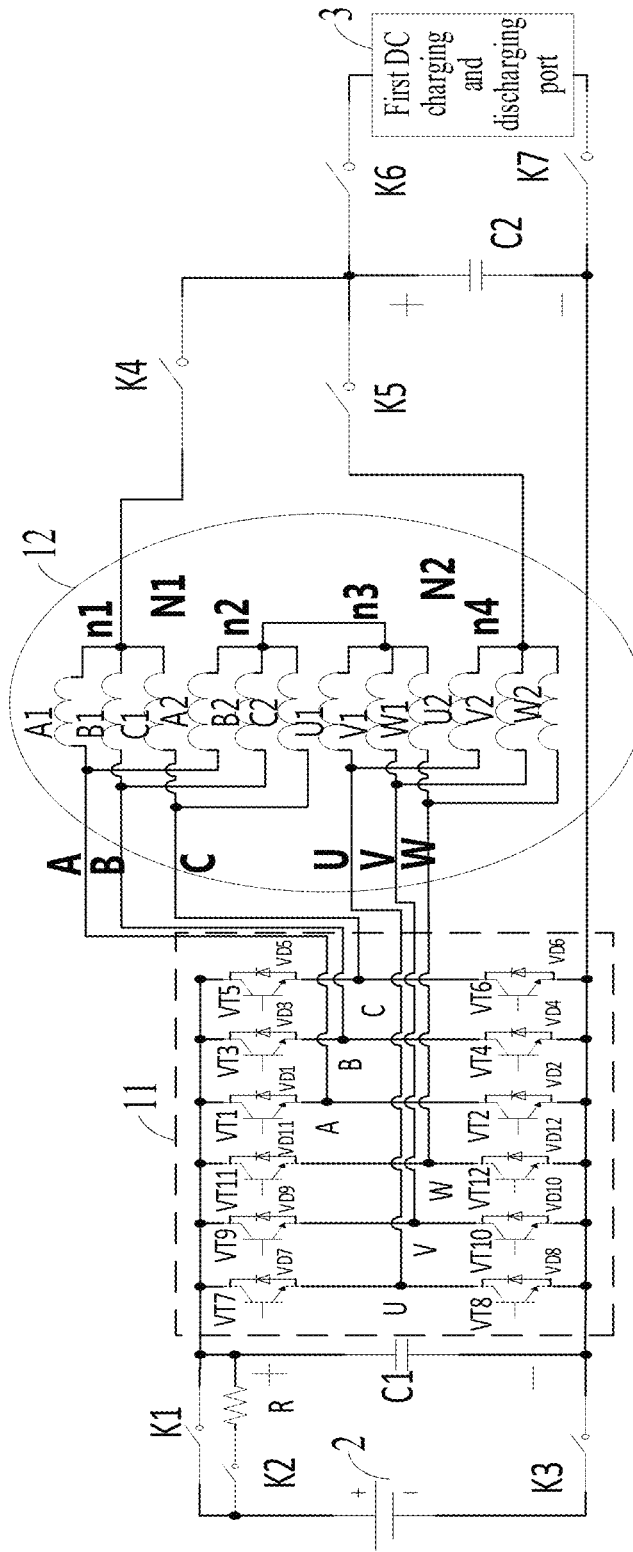
FIG. 2 is a schematic diagram of a circuit structure of an energy conversion device according to a first embodiment of this application.

Specifically, the schematic diagram of the circuit structure shown in FIG. 2 is used as an example. The one set of 6 phase bridge arms specifically includes a first power switch unit, a second power switch unit, a third power switch unit, a fourth power switch unit, a fifth power switch unit, a sixth power switch unit, a seventh power switch unit, an eighth power switch unit, a ninth power switch unit, a tenth power switch unit, an eleventh power switch unit, and a twelfth power switch unit. The first power switch unit includes a first upper bridge arm VT1 and a first upper bridge diode VD1. The second power switch unit includes a second lower bridge arm VT2 and a second lower bridge diode VD2. The third power switch unit includes a third upper bridge arm VT3 and a third upper bridge diode VD3. The fourth power switch unit includes a fourth lower bridge arm VT4 and a fourth lower bridge diode VD4. The fifth power switch unit includes a fifth upper bridge arm VT5 and a fifth upper bridge diode VD5. The sixth power switch unit includes a sixth lower bridge arm VT6 and a sixth lower bridge diode VD6. The seventh power switch unit includes a seventh upper bridge arm VT7 and a seventh upper bridge diode VD7. The eighth power switch unit includes an eighth lower bridge arm VT8 and an eighth lower bridge diode VD8. The ninth power switch unit includes a ninth upper bridge arm VT9 and a ninth upper bridge diode VD9. The tenth power switch unit includes a tenth lower bridge arm VT10 and a tenth lower bridge diode VD10. The eleventh power switch unit includes an eleventh upper bridge arm VT11 and an eleventh upper bridge diode VD11. The twelfth power switch unit includes a twelfth lower bridge arm VT12 and a twelfth lower bridge diode VD12.

A first end of the first power switch unit, a first end of the third power switch unit, a first end of the fifth power switch unit, a first end of the seventh power switch unit, a first end of the ninth power switch unit, and a first end of the eleventh power switch unit are connected jointly to form a first bus terminal, and a second end of the second power switch unit, a second end of the fourth power switch unit, a second end of the sixth power switch unit, a second end of the eighth power switch unit, a second end of the tenth power switch unit, and a second end of the twelfth power switch unit are connected jointly to form a second bus terminal. The first end of the battery 2 is connected with the first bus terminal through a switch K1, the second end of the battery 2 is connected with the second bus terminal through a switch K3, a capacitor C1 is disposed between the first bus terminal and the second bus terminal, and a switch K2 and a resistor R that are connected in series are connected with the switch K1 in parallel.

A midpoint of the first power switch unit and the second power switch unit, a midpoint of the third power switch unit and the fourth power switch unit, and a midpoint of the fifth power switch unit and the sixth power switch unit are respectively connected with three phase endpoints (A, B, and C) of the first winding unit N1 in a one-to-one correspondence. A midpoint of the seventh power switch unit and the eighth power switch unit, a midpoint of the ninth power switch unit and the tenth power switch unit, and a midpoint of the eleventh power switch unit and the twelfth power switch unit are respectively connected with three phase endpoints (U, V, and W) of the second winding unit N2 in a one-to-one correspondence. Two neutral lines are respectively led out from the first winding unit N1 and the second winding unit N2, one neutral line (led out from a connection point n2) in the first winding unit N1 is connected with one neutral line (led out from a connection point n3) in the second winding unit N2, another neutral line (led out from a connection point n1) in the first winding unit N1 is connected with the first end of the first DC charging and discharging port 3 through a switch K4 and a switch K6, and another neutral line (led out from a connection point n4) in the second winding unit N2 is connected with the first end of the first DC charging and discharging port 3 through a switch K5 and the switch K6. The second end of the first DC charging and discharging port 3 is connected with the second end of the battery 2, and a capacitor C2 is disposed at the first end of the first DC charging and discharging port 3 and the second end of the first DC charging and discharging port 3.

In the schematic diagram of the circuit structure shown in FIG. 2, the first end of the first DC charging and discharging port 3 may be both connected with the first winding unit N1 or may be connected with the second winding unit N2. That is, in the schematic diagram of the circuit structure shown in FIG. 2, the first DC charging and discharging port 3, the first winding unit N1, the second winding unit N2, the reversible PWM rectifier 11, and the battery 2 form a DC charging and discharging circuit; or the first DC charging and discharging port 3, the first winding unit N1, the reversible PWM rectifier 11, and the battery 2 form a DC charging and discharging circuit; or the first DC charging and discharging port 3, the second winding unit N2, the reversible PWM rectifier 11, and the battery 2 form a DC charging and discharging circuit.

Figure 3:
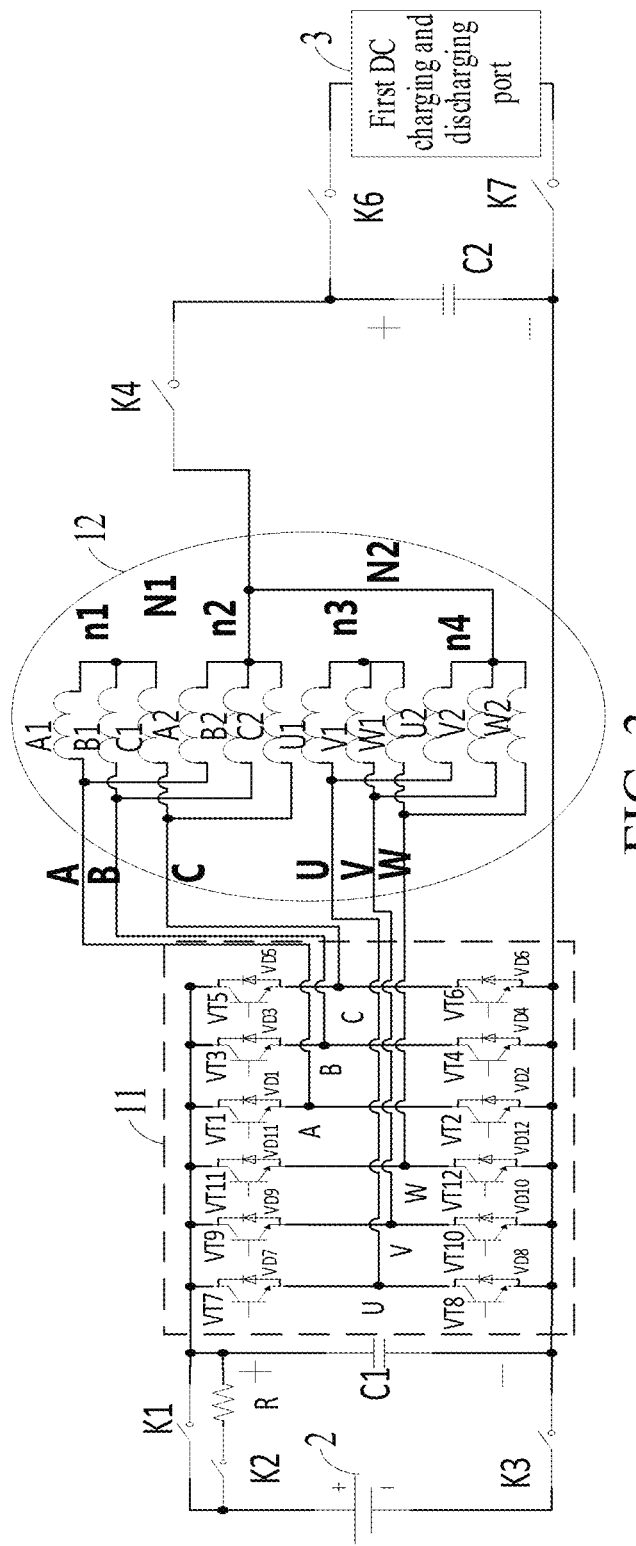
FIG. 3 is a schematic diagram of another circuit structure of an energy conversion device according to a first embodiment of this application.

FIG. 3 is a schematic diagram of a circuit structure of this implementation. When both the first winding unit N1 and the second winding unit N2 lead out one neutral line, the first winding unit N1 and the second winding unit N2 are connected through the neutral lines and are connected with the first end of the first DC charging and discharging port 3. In this case, the first DC charging and discharging port 3, the first winding unit N1, the second winding unit N2, the reversible PWM rectifier 11, and the battery 2 form a DC charging circuit or a DC discharging circuit.

Figure 4:
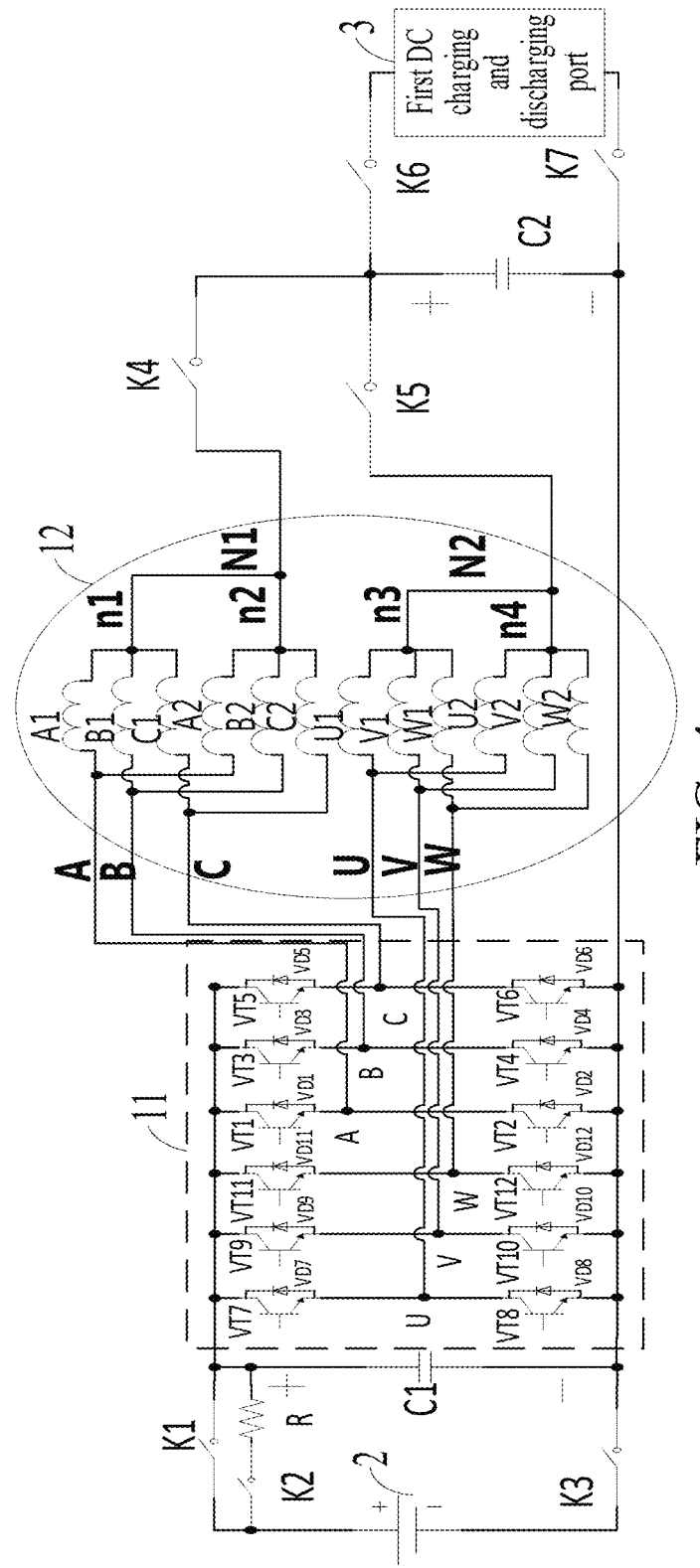
FIG. 4 is a schematic diagram of another circuit structure of an energy conversion device according to a first embodiment of this application.

FIG. 4 is a schematic diagram of another circuit structure of this implementation. In this case, both the first winding unit N1 and the second winding unit N2 lead out two neutral lines, the two neutral lines in the first winding unit N1 are connected with the first end of the first DC charging and discharging port 3 after being connected jointly, and the two neutral lines in the second winding unit N2 are connected with the first end of the first DC charging and discharging port 3 after being connected jointly. In this case, the first DC charging and discharging port 3, the first winding unit N1, the second winding unit N2, the reversible PWM rectifier 11, and the battery 2 form a DC charging circuit or a DC discharging circuit; or the first DC charging and discharging port 3, the second winding unit N2, the reversible PWM rectifier 11, and the battery 2 form a DC charging circuit or a DC discharging circuit.

Figure 5:
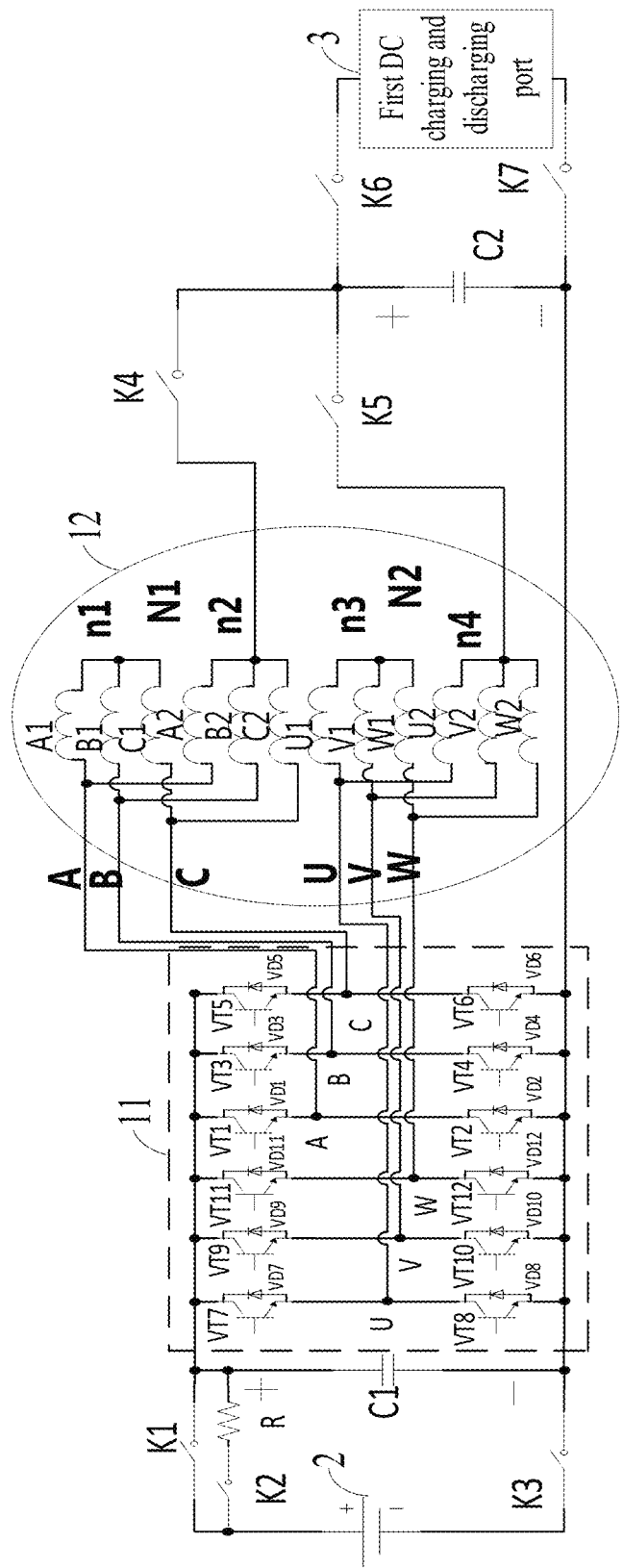
FIG. 5 is a schematic diagram of another circuit structure of an energy conversion device according to a first embodiment of this application.

FIG. 5 is a schematic diagram of another circuit structure of this implementation. When both the first winding unit N1 and the second winding unit N2 lead out one neutral line, the first winding unit N1 and the second winding unit N2 are connected through neutral lines and are connected with the first end of the first DC charging and discharging port 3. In this case, the first DC charging and discharging port 3, the first winding unit N1, the second winding unit N2, the reversible PWM rectifier 11, and the battery 2 form a DC charging circuit or a DC discharging circuit; or the first DC charging and discharging port 3, the first winding unit N1, the reversible PWM rectifier 11, and the battery 2 form a DC charging circuit or a DC discharging circuit; or the first DC charging and discharging port 3, the second winding unit N2, the reversible PWM rectifier 11, and the battery 2 form a DC charging circuit or a DC discharging circuit.

Figure 6:
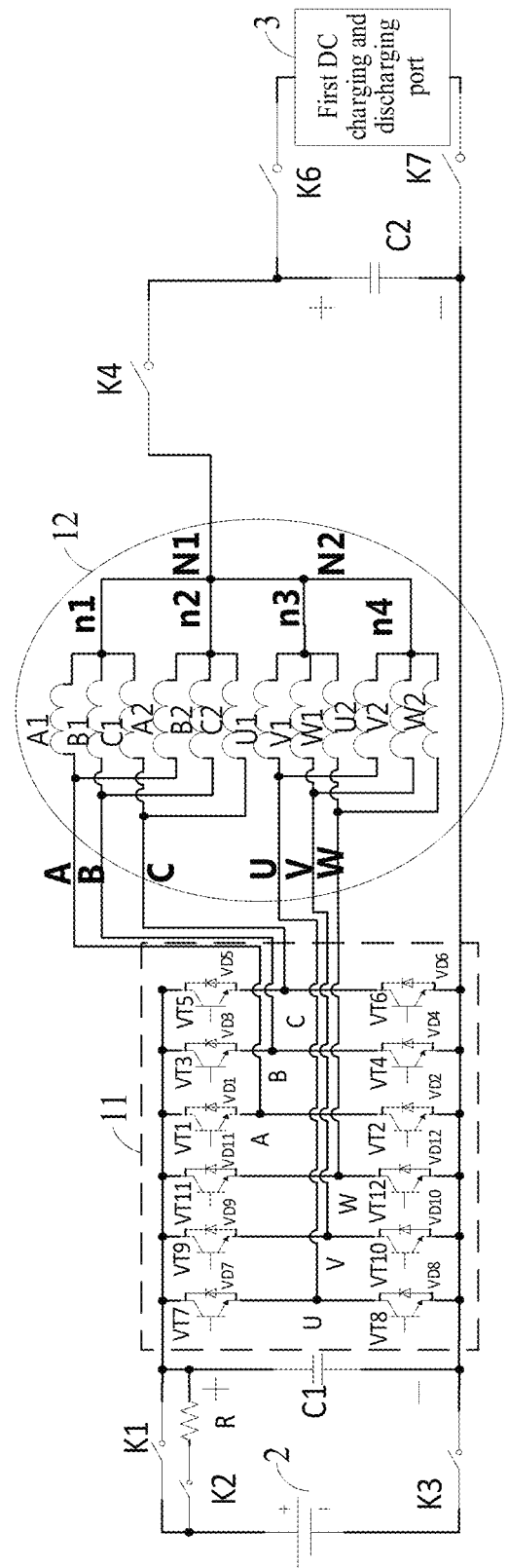
FIG. 6 is a schematic diagram of another circuit structure of an energy conversion device according to a first embodiment of this application.

FIG. 6 is a schematic diagram of another circuit structure of this implementation. Both the first winding unit N1 and the second winding unit N2 lead out two neutral lines, the neutral lines in the first winding unit N1 and the second winding unit N2 are connected with the first end of the first DC charging and discharging port 3 after being connected jointly. In this case, the first DC charging and discharging port 3, the first winding unit N1, the second winding unit N2, the reversible PWM rectifier 11, and the battery 2 form a DC charging circuit or a DC discharging circuit.

In this implementation, inductance generated by the motor coil 12 is adjusted by setting the number of coil branches in each phase winding in the motor coil 12, and different connection manners between the neutral lines in the first winding unit N1 and/or the second winding unit N2 and the first DC charging and discharging port 3 may be selected, to meet requirements for charging power or discharging power in different cases, so that the flexibility of the energy conversion device is greatly improved.

Further, as an implementation of this embodiment, when $n_1 \geq T_1 \geq 2$ and $T_1 \geq J_1 \geq 2$, at least one neutral line in the $J_1$ neutral lines is connected with at least one neutral line in the $J_2$ neutral lines, and at least another neutral line in the $J_1$ neutral lines is connected with the first end of the first DC charging and discharging port 3.

In this implementation, the first end of the first DC charging and discharging port 3 is connected with the first winding unit N1, and the first DC charging and discharging port 3, the first winding unit N1, the second winding unit N2, the reversible PWM rectifier 11, and the battery 2 form a DC charging and discharging circuit; or the first DC charging and discharging port 3, the first winding unit N1, the reversible PWM rectifier 11, and the battery 2 form a DC charging and discharging circuit.

Figure 7:
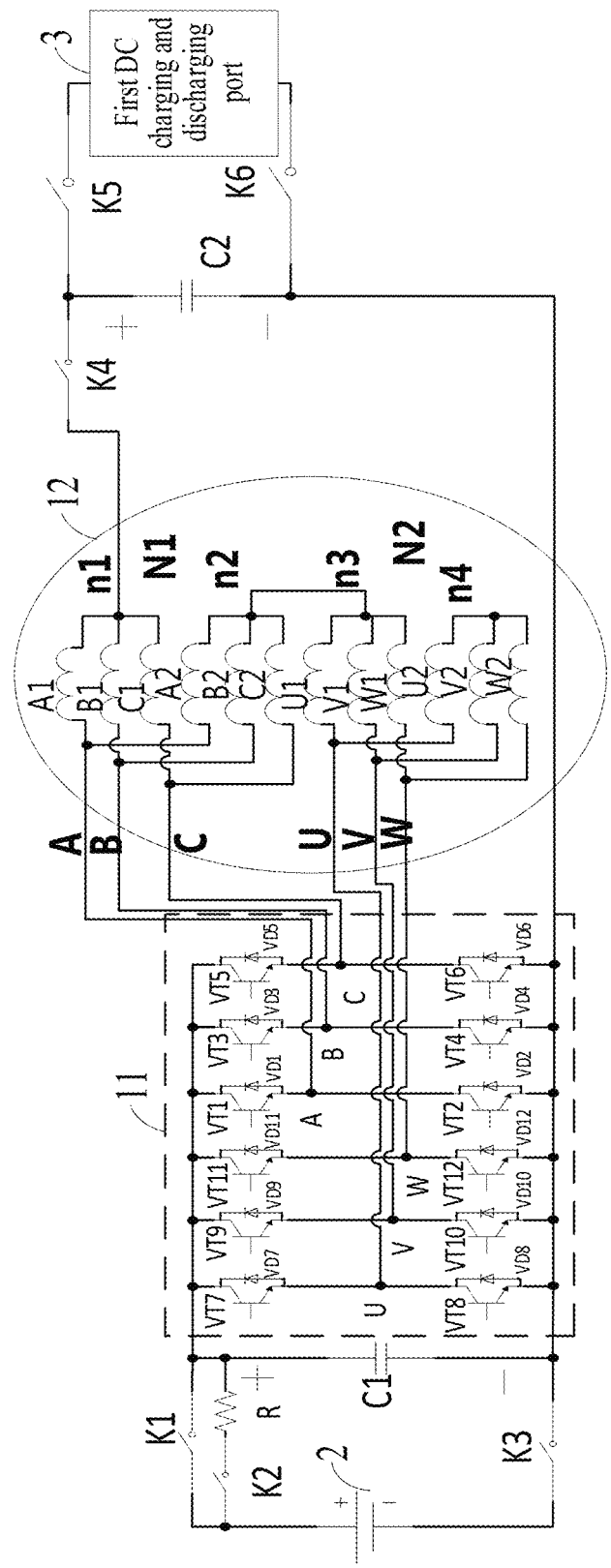
FIG. 7 is a schematic diagram of another circuit structure of an energy conversion device according to a first embodiment of this application.

Specifically, FIG. 7 is a schematic diagram of a circuit structure of this implementation, and a difference with the schematic diagram of the circuit structure shown in FIG. 2 lies in that, one neutral line is led out from the second winding unit N2, and the first end of the first DC charging and discharging port 3 is not connected with the second winding unit N2.

Figure 8:
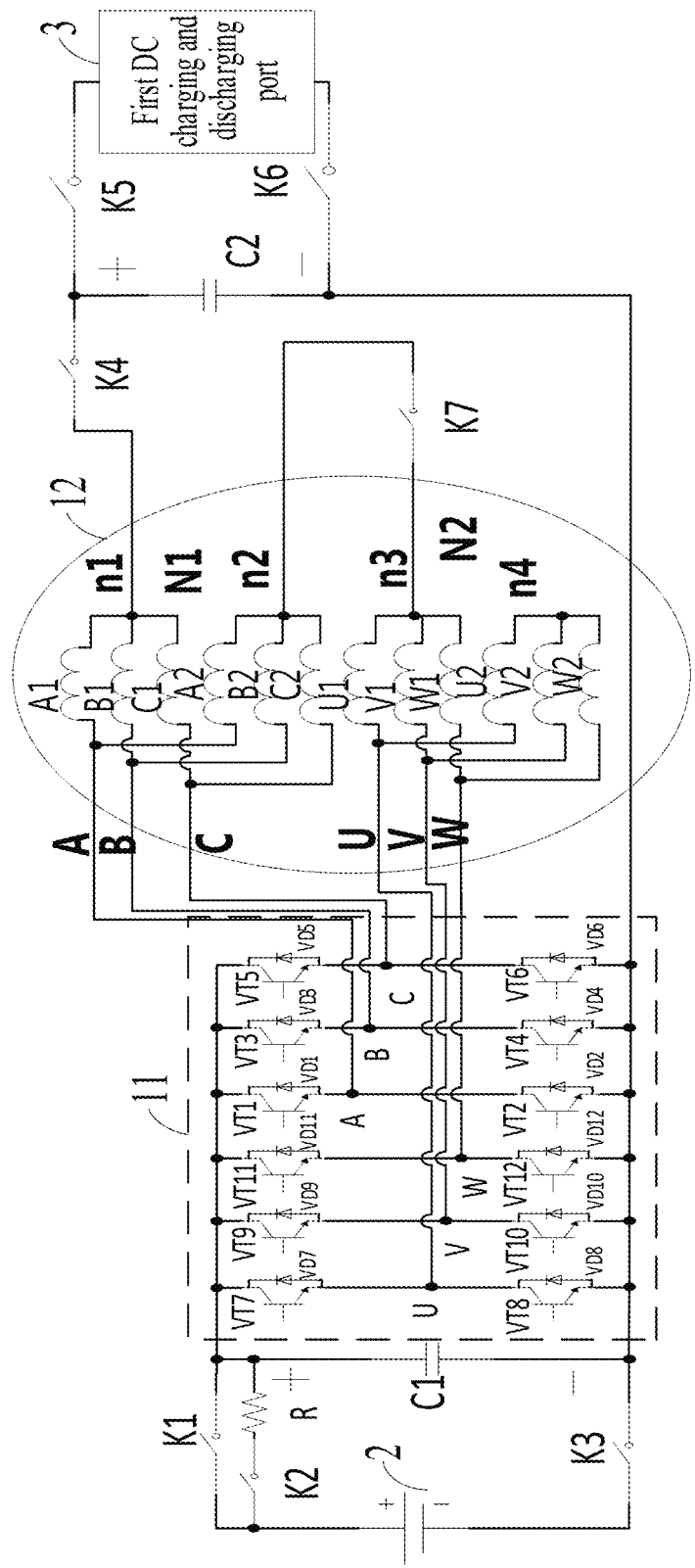
FIG. 8 is a schematic diagram of another circuit structure of an energy conversion device according to a first embodiment of this application.

FIG. 8 is a schematic diagram of another circuit structure of this implementation, and a difference with the schematic diagram of the circuit structure shown in FIG. 7 lies in that, a neutral line (led out from the connection point n2) of the first winding unit N1 is connected with a neutral line (led out from the connection point n3) of the second winding unit N2 through a switch K7. By controlling a switch-on or switch-off state of the switch K7, different DC charging and discharging circuits may be selected for working.

In this implementation, a DC charging and discharging circuit formed by the first DC charging and discharging port 3, the first winding unit N1, the second winding unit N2, the reversible PWM rectifier 11, and the battery 2 or a DC charging and discharging circuit formed by the first DC charging and discharging port 3, the first winding unit N1, the reversible PWM rectifier 11, and the battery 2 may be selected for working, and different DC charging and discharging circuits are selected according to different DC charging and discharging requirements.

Further, as an implementation of this embodiment, when $n_2 \geq T_2 \geq 2$ and $T_2 \geq J_2 \geq 2$, at least another neutral line in the $J_2$ neutral lines is connected with a first end of an external second DC charging and discharging port 4, and the second DC charging and discharging port 4, the motor coil 12, the reversible PWM rectifier 11, and the battery 2 form a DC charging circuit or a DC discharging circuit.

In this implementation, the first DC charging and discharging port 3, the first winding unit N1, the second winding unit N2, the reversible PWM rectifier 11, and the battery 2 form a DC charging and discharging circuit; the first DC charging and discharging port 3, the first winding unit N1, the reversible PWM rectifier 11, and the battery 2 form a DC charging and discharging circuit; the second DC charging and discharging port 4, the second winding unit N2, the first winding unit N1, the reversible PWM rectifier 11, and the battery 2 form a DC charging and discharging circuit; or the second DC charging and discharging port 4, the second winding unit N2, the reversible PWM rectifier 11, and the battery 2 form a DC charging and discharging circuit.

It should be noted that, in this implementation, cases that the first DC charging and discharging port 3, the first winding unit N1, the reversible PWM rectifier 11, and the battery 2 form a DC charging and discharging circuit and the first DC charging and discharging port 3, the second winding unit N2, the reversible PWM rectifier 11, and the battery 2 form a DC charging and discharging circuit may be performed at the same time. That is, in this implementation, the energy conversion device can implement charging or discharging by using the two DC charging and discharging ports, and can further implement DC charging by using one DC charging and discharging port and implement DC discharging by using another DC charging and discharging port.

Figure 9:
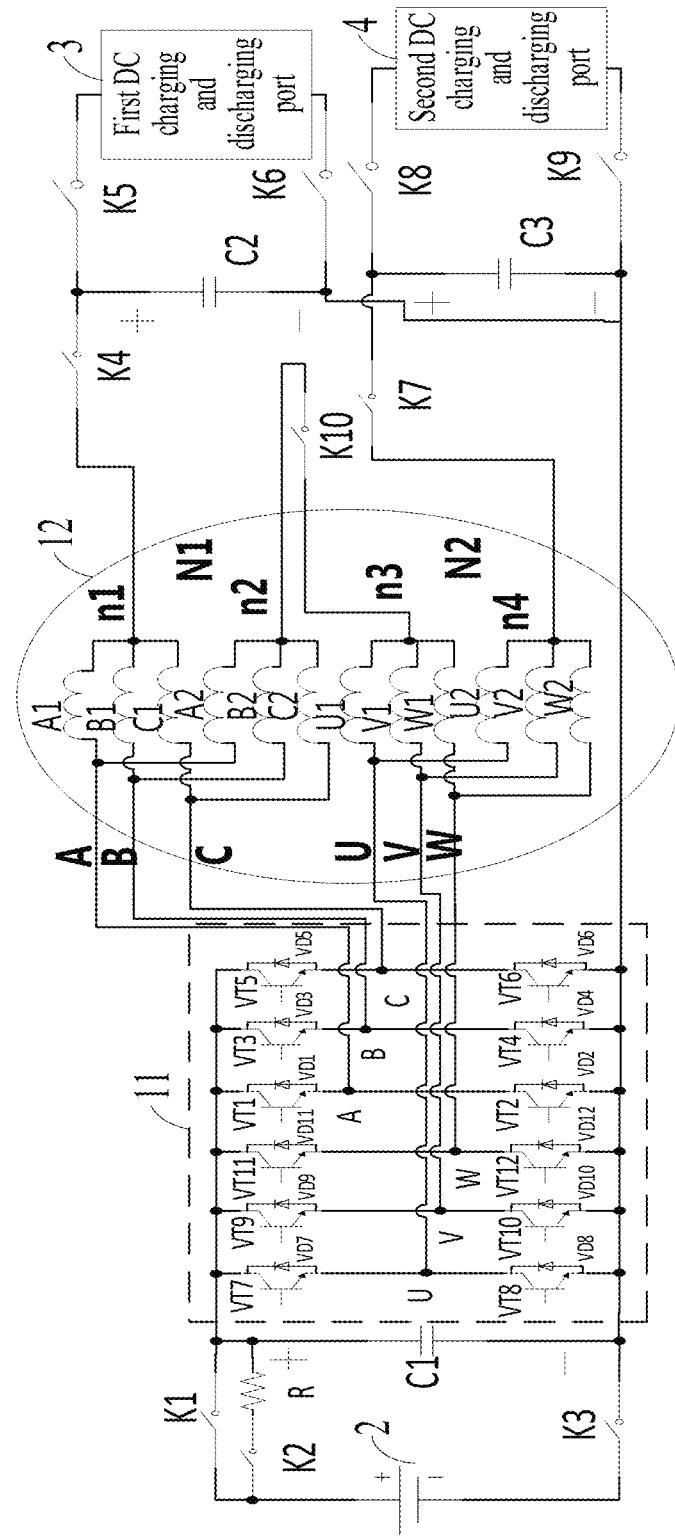
FIG. 9 is a schematic diagram of another circuit structure of an energy conversion device according to a first embodiment of this application.

Specifically, the schematic diagram of the circuit structure shown in FIG. 9 is used as an example. The first end of the second DC charging and discharging port 4 is connected with one neutral line (led out from the connection point n4) of the second winding unit N2, and a second end of the second DC charging and discharging port 4 is connected with the second bus terminal of the reversible PWM rectifier 11.

In this implementation, the energy conversion device is connected with the external second DC charging and discharging port 4, so that the energy conversion device can implement charging or discharging by using two DC charging and discharging ports at the same time, and can further implement DC charging by using one DC charging and discharging port and implement DC discharging by using another DC charging and discharging port, thereby improving the charging and discharging efficiency and enlarging an application scope of the energy conversion device.

In this embodiment, the motor coil 12 should include at least two sets of winding units. That is, the motor coil 12 may alternatively include three sets of winding units or four sets of winding units.

Figure 10:
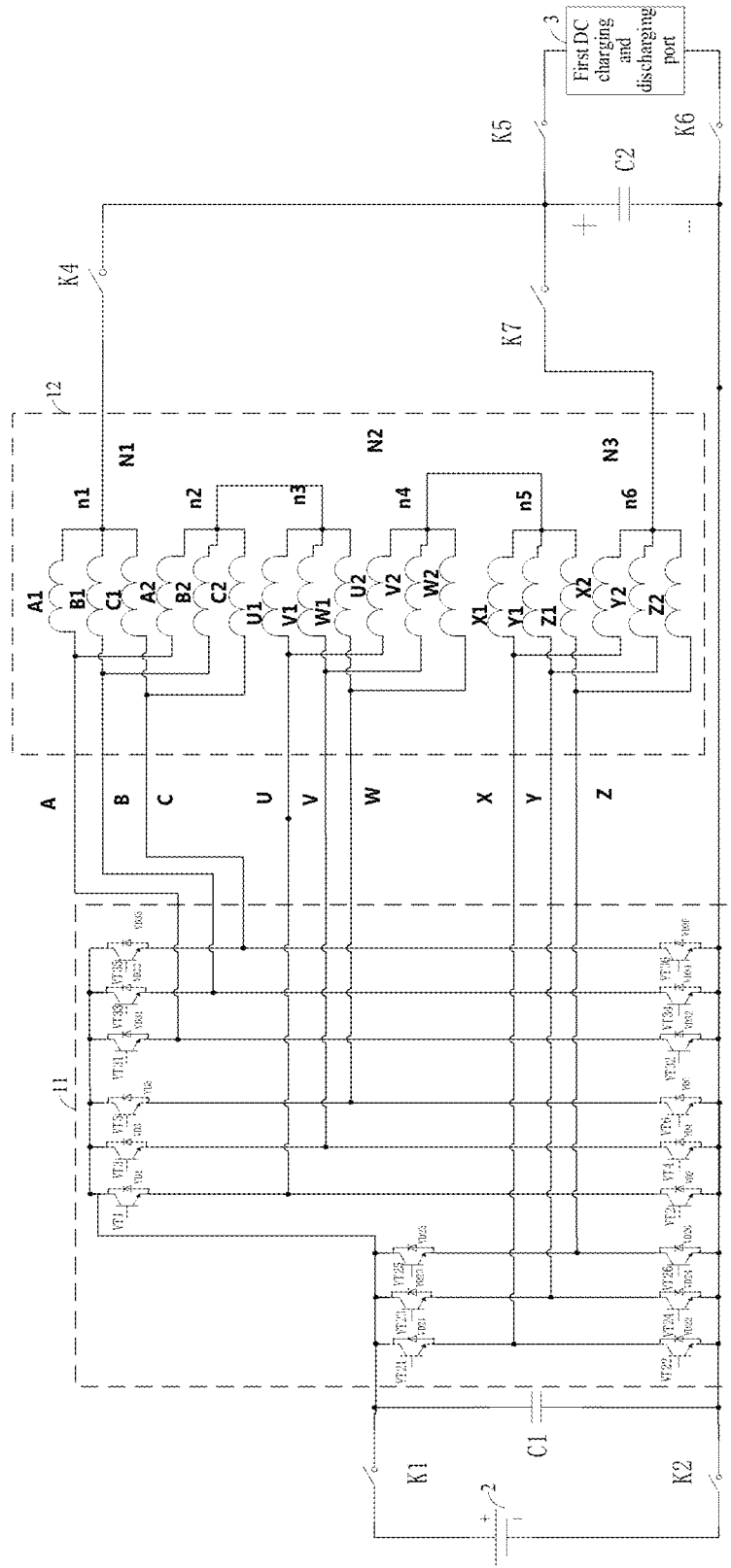
FIG. 10 is a schematic diagram of another circuit structure of an energy conversion device according to a first embodiment of this application.

In the schematic diagram of the circuit structure shown in FIG. 10, in this case, the motor coil 12 includes three sets of winding units, which are respectively a first winding unit N1, a second winding unit N2, and a third winding unit N3. The first winding unit N1 and the second winding unit N2 are connected through neutral lines, and the second winding unit N2 and the third winding unit N3 are also connected through neutral lines. The first end of the first DC charging and discharging port 3 is respectively connected with the first winding unit N1 and the third winding unit N3, the first DC charging and discharging port 3, the first winding unit N1, the second winding unit N2, the third winding unit N3, the reversible PWM rectifier 11, and the battery 2 form a DC charging and discharging circuit; the first DC charging and discharging port 3, the first winding unit N1, the second winding unit N2, the reversible PWM rectifier 11, and the battery 2 form a DC charging and discharging circuit; or the first DC charging and discharging port 3, the first winding unit N1 and the third winding unit N3, the reversible PWM rectifier 11, and the battery 2 form a DC charging and discharging circuit.

Figure 11:
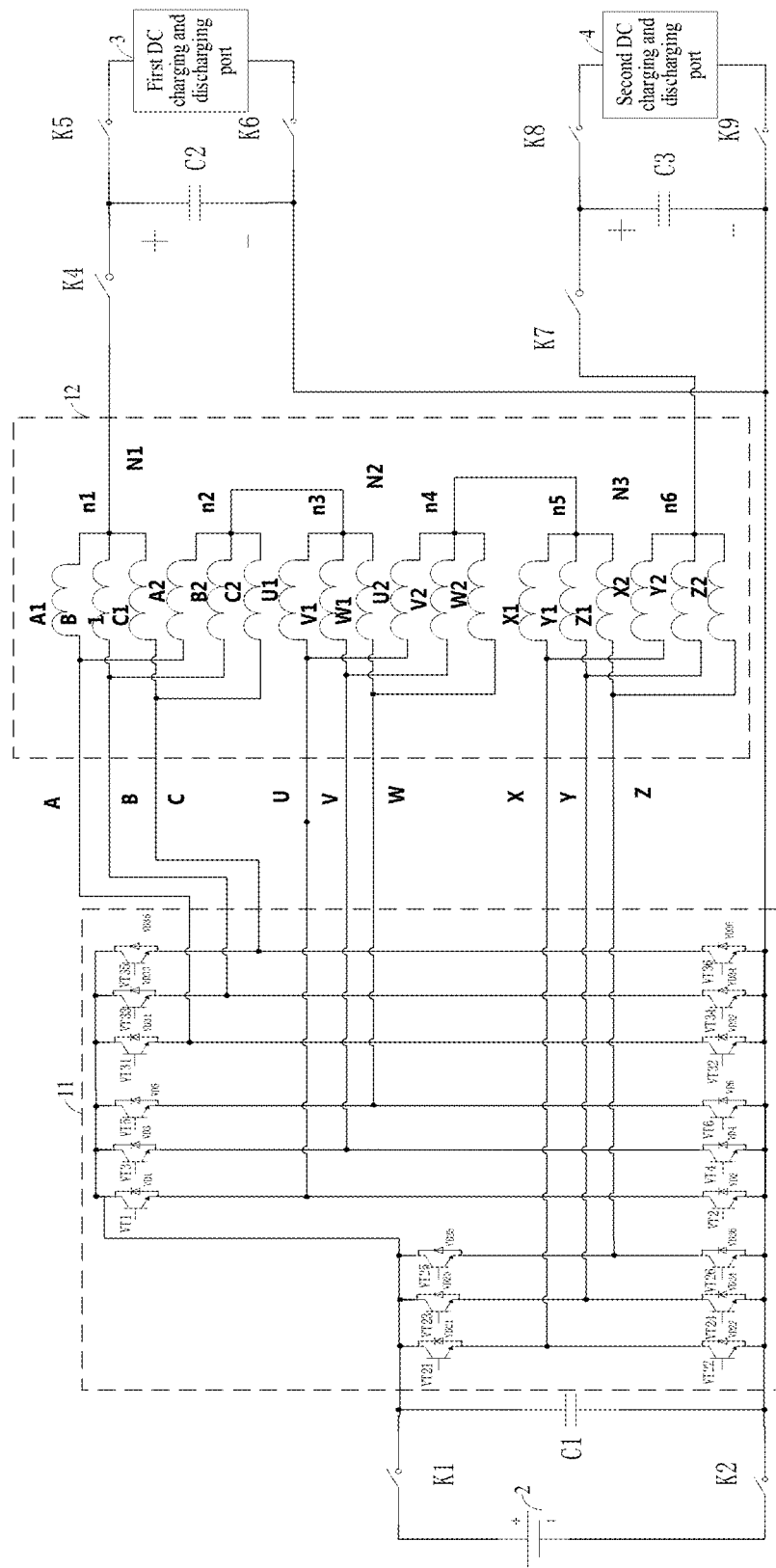
FIG. 11 is a schematic diagram of another circuit structure of an energy conversion device according to a first embodiment of this application.

In the schematic diagram of the circuit structure shown in FIG. 11, in this case, the motor coil 12 includes three sets of winding units, which are respectively a first winding unit N1, a second winding unit N2, and a third winding unit N3. The first end of the first DC charging and discharging port 3 is connected with the first winding unit N1, the first end of the second DC charging and discharging port 4 is connected with the third winding unit N3, and the second bus terminal of the reversible PWM rectifier 11 is respectively connected with the second end of the first DC charging and discharging port 3 and the second end of the second DC charging and discharging port 4. The first winding unit N1 and the second winding unit N2 are connected through neutral lines, and the second winding unit N2 and the third winding unit N3 are also connected through neutral lines. The first DC charging and discharging port 3, the first winding unit N1, the second winding unit N2, the third winding unit N3, the reversible PWM rectifier 11, and the battery 2 form a DC charging and discharging circuit; the second DC charging and discharging port 4, the third winding unit N3, the second winding unit N2, the first winding unit N1, the reversible PWM rectifier 11, and the battery 2 form a DC charging and discharging circuit; the first DC charging and discharging port 3, the first winding unit N1, the second winding unit N2, the reversible PWM rectifier 11, and the battery 2 form a DC charging and discharging circuit; the second DC charging and discharging port 4, the second winding unit N2, the third winding unit N3, the reversible PWM rectifier 11, and the battery 2 form a DC charging and discharging circuit; the first DC charging and discharging port 3, the first winding unit N1, the reversible PWM rectifier 11, and the battery 2 form a DC charging and discharging circuit; and the second DC charging and discharging port 4, the third winding unit N3, the reversible PWM rectifier 11, and the battery 2 form a DC charging and discharging circuit.

In the schematic diagram of the circuit structure shown in FIG. 11, the energy conversion device can implement charging or discharging by using two DC charging and discharging ports at the same time, and can further implement DC charging by using one DC charging and discharging port and implement DC discharging by using another DC charging and discharging port.

Figure 12:
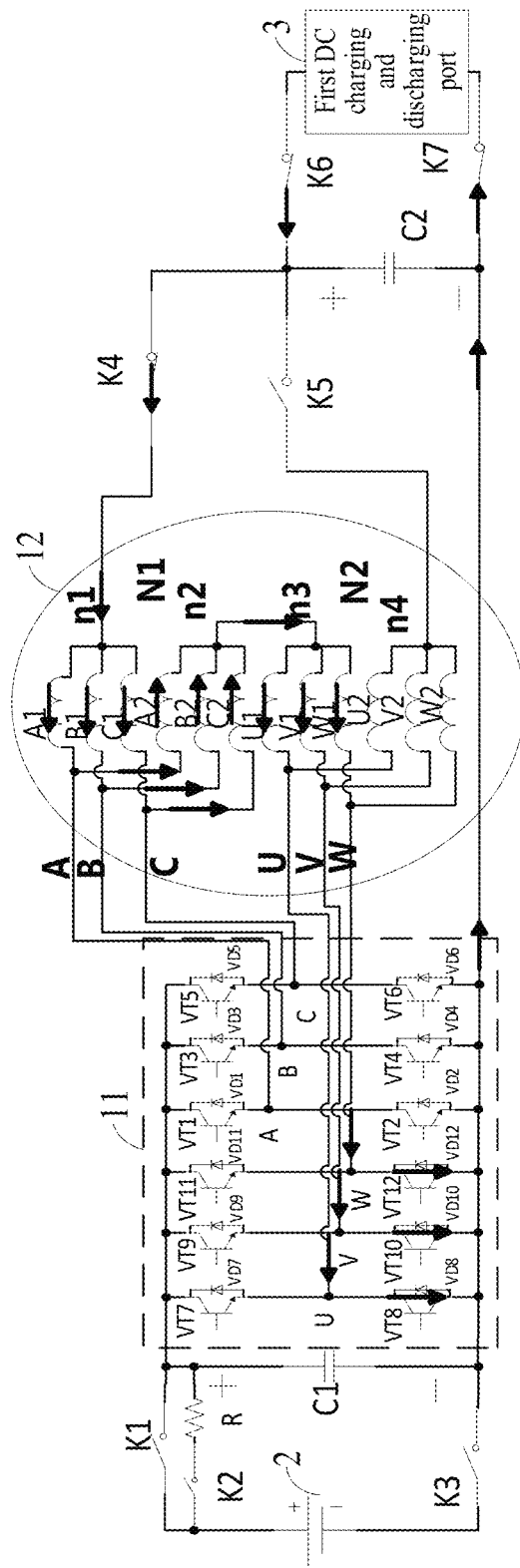
FIG. 12 is a schematic diagram of a flowing direction of a current of an energy conversion device according to a first embodiment of this application.

To understand a flowing direction of a current in a working process of a DC charging circuit in this embodiment more clearly, a description is made on the flowing direction of the current by using an example in which the first DC charging and discharging port 3, the first winding unit N1, the second winding unit N2, the reversible PWM rectifier 11, and the battery 2 form a DC charging circuit in the schematic diagram of the circuit structure shown in FIG. 2:

As shown in FIG. 12, a controller controls the switch K1, the switch K5, the switch K4, the switch K6, and the switch K7 to be switched off, and controls the switch K2 and the switch K3 to be switched on, to complete a pre-charging process of the capacitor C1 by using the resistor R; controls the switch K2 to be switched off, controls the switch K1, the switch K4, the switch K6, and the switch K7 to be switched on, controls the eighth lower bridge arm VT8, the tenth lower bridge arm VT10, the twelfth lower bridge arm VT12 to be switched on, and controls the first power switch unit, the second power switch unit, the third power switch unit, the fourth power switch unit, the fifth power switch unit, the sixth power switch unit, the seventh power switch unit, the ninth power switch unit, and the eleventh power switch unit to be switched off. The first DC charging and discharging port 3 outputs a direct current, and the first DC charging and discharging port forms a DC charging and storing circuit with the first winding unit N1, the second winding unit N2, the eighth lower bridge arm VT8, the tenth lower bridge arm VT10, and the twelfth lower bridge arm VT12. In this case, the first winding unit N1 and the second winding unit N2 access to some coil branches of the charging and discharging circuit to complete energy storage.

Figure 13:
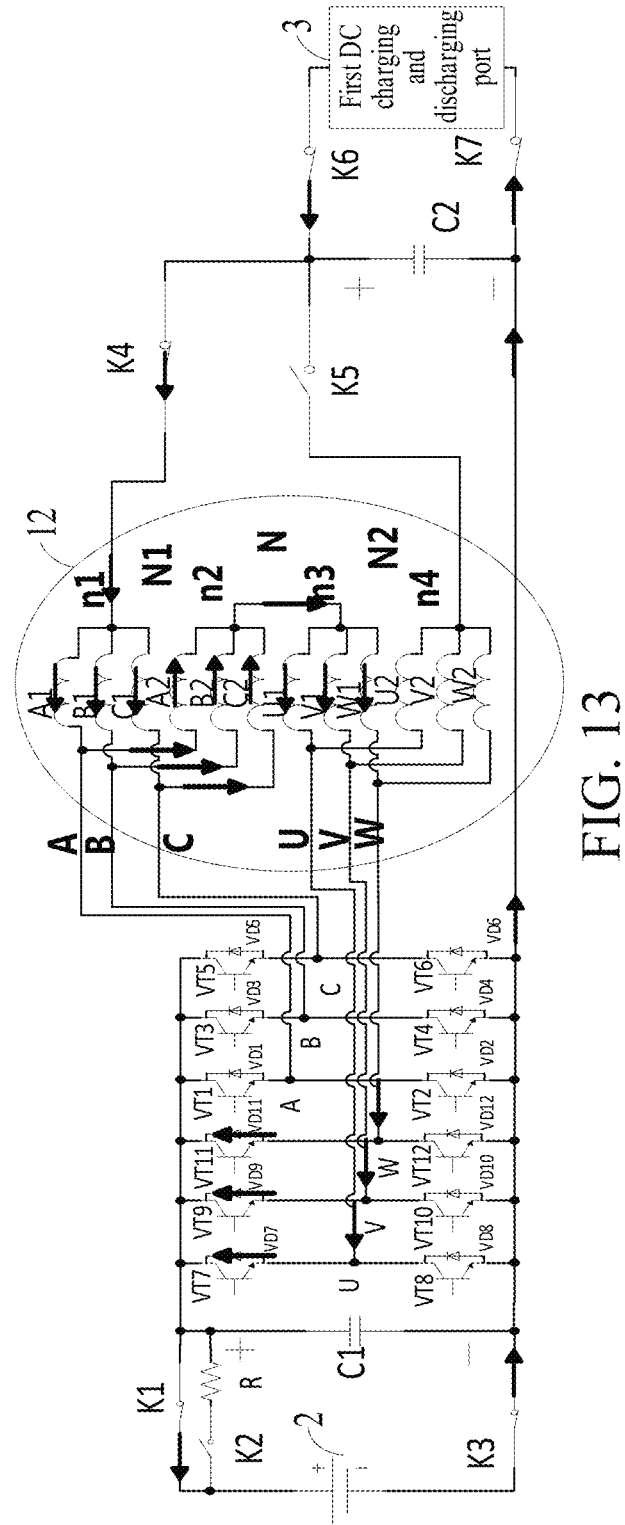
FIG. 13 is a schematic diagram of another flowing direction of a current of an energy conversion device according to a first embodiment of this application.

As shown in FIG. 13, the seventh upper bridge diode VD7, the ninth upper bridge diode VD9, the eleventh upper bridge diode VD11 are controlled to be switched on, and the first power switch unit, the second power switch unit, the third power switch unit, the fourth power switch unit, the fifth power switch unit, the sixth power switch unit, the eighth power switch unit, the tenth power switch unit, the twelfth power switch unit are controlled to be switched off. The first DC charging and discharging port 3 outputs a direct current, and the first DC charging and discharging port forms a DC charging and releasing circuit with the first winding unit N1, the second winding unit N2, the seventh upper bridge diode VD7, the ninth upper bridge diode VD9, and the eleventh upper bridge diode VD11. In this case, the first winding unit N1 and the second winding unit N2 complete stored energy releasing, and the seventh upper bridge diode VD7, the ninth upper bridge diode VD9, and the eleventh upper bridge diode VD11 output a boosted direct current to charge the battery 2.

Working processes of other DC charging circuits are similar to the foregoing description, and details are not described herein again.

Working processes of DC discharging circuits are contrary to the flowing direction of the current in the DC charging circuit, but a control method is similar to that of the DC charging circuit, so that details are not described herein again.

Further, as an implementation of this embodiment, the energy conversion device further includes a bus capacitor, and the bus capacitor is connected with the reversible PWM rectifier 11 in parallel.

Specifically, a first end of the bus capacitor is connected with the first bus terminal of the reversible PWM rectifier 11, and a second end of the bus capacitor is connected with the second bus terminal of the reversible PWM rectifier 11. When the bus capacitor is applied to the schematic diagram of the circuit structure shown in FIG. 2, the bus capacitor is the capacitor C1 in the schematic diagram of the circuit structure shown in FIG. 2.

When the first DC charging and discharging port 3, one of the winding units in the motor coil 12, the reversible PWM rectifier 11, and the battery 2 form a DC charging and discharging circuit, the bus capacitor, the reversible PWM rectifier 11, the first winding unit N1, and the second winding unit N2 can further form a heating circuit at the same time.

The schematic diagram of the circuit structure shown in FIG. 2 is used as an example. When the first DC charging and discharging port 3, the first winding unit N1, the reversible PWM rectifier 11, and the battery 2 form a DC charging and discharging circuit, or when the first DC charging and discharging port 3, the second winding unit N2, the reversible PWM rectifier 11, and the battery 2 form a DC charging and discharging circuit, the capacitor C1, the reversible PWM rectifier 11, the first winding unit N1, and the second winding unit N2 form a heating circuit.

In this implementation, a current inputted by the battery 2 or the first DC charging and discharging port 3 generates heat when flowing through the motor coil 12 to heat the battery 2, or an external device is used to generate heat to heat the battery. By using the motor coil 12 to heat the battery, the problems of a complex structure, a low degree of integration, a large volume, and high costs of a battery heating control circuit of an electric vehicle in the related art are resolved, and devices (for example, a Positive Temperature Coefficient (PTC) heater or a heating wire heater) specifically configured to heat the battery in the related art may be omitted.

Further, as an implementation of this embodiment, the energy conversion device further includes a controller, the first DC charging and discharging port 3 is connected with a DC power supply device, and the controller is configured to control the DC power supply device, the first DC charging and discharging port 3, one of the winding units in the motor coil 12, and the reversible PWM rectifier 11 to form a charging and storing circuit, and control the DC power supply device, the first DC charging and discharging port 3, one of the winding units in the motor coil 12, the reversible PWM rectifier 11, and the battery 2 to form a charging and releasing circuit. The controller is further configured to control the bus capacitor, the reversible PWM rectifier 11, one of the winding units in the motor coil 12, and another winding unit in the motor coil 12 to form a heating and storing circuit, and control one of the winding units in the motor coil 12, another winding unit in the motor coil 12, and the reversible PWM rectifier 11 to form a heating and releasing circuit.

An electrical energy source of the bus capacitor may be electrical energy outputted by the battery 2 or may be electrical energy provided by an external device. Specifically, the external device providing electrical energy may be a DC power supply device or may be another power supply device.

The schematic diagram of the circuit structure shown in FIG. 2 is used as an example. In this case, the first DC charging and discharging port 3, the second winding unit N2, the reversible PWM rectifier 11, and the battery 2 form a DC charging and discharging circuit, and the capacitor C1, the reversible PWM rectifier 11, the first winding unit N1, and the second winding unit N2 form a heating circuit.

In the DC charging and discharging circuit formed by the first DC charging and discharging port 3, the second winding unit N2, the reversible PWM rectifier 11, and the battery 2, the first DC charging and discharging port 3, the second winding unit N2, the reversible PWM rectifier 11 form a DC charging and storing circuit, and the first DC charging and discharging port 3, the second winding unit N2, the reversible PWM rectifier 11, and the battery 2 form a DC charging and releasing circuit. The foregoing DC charging and storing circuit completes an energy storage process of the second winding unit N2, the foregoing DC charging and releasing circuit completes a stored energy releasing process of the second winding unit N2, and a boosted direct current is outputted by using the reversible PWM rectifier 11 to charge the battery 2.

In the heating circuit formed by the capacitor C1, the reversible PWM rectifier 11, the first winding unit N1, and the second winding unit N2, the capacitor C1, the reversible PWM rectifier 11, the first winding unit N1, and the second winding unit N2 form a heating and storing circuit, and the first winding unit N1, the second winding unit N2, and the reversible PWM rectifier 11 form a heating and releasing circuit.

Figure 14:
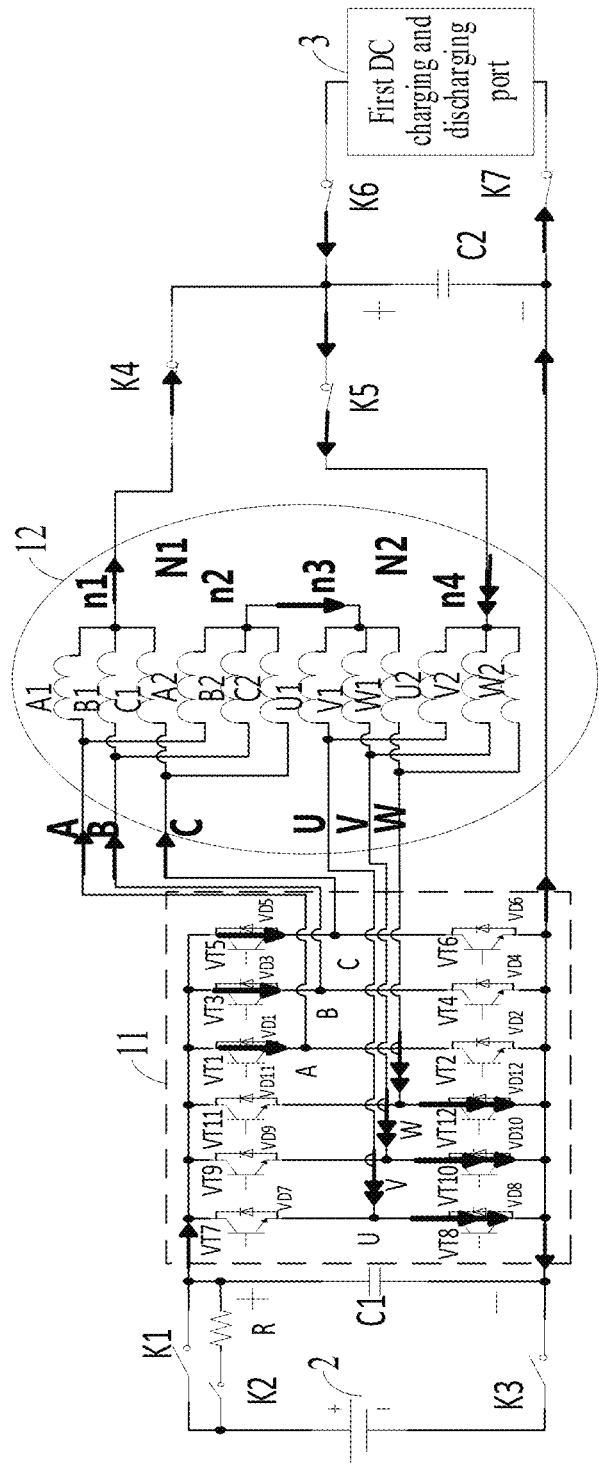
FIG. 14 is a schematic diagram of another flowing direction of a current of an energy conversion device according to a first embodiment of this application.

To understand the foregoing energy storage and energy releasing processes more clearly, a description is made on flowing directions of a current in the foregoing energy storage and energy releasing processes below by using the schematic diagram of the circuit structure shown in FIG. 2 as an example:

As shown in FIG. 14, the switch K1, the switch K5, the switch K4, the switch K6, and the switch K7 are switched off, the switch K2 and the switch K3 are switched on to complete a pre-charging process of the capacitor C1 through the resistor R. The switch K2 is switched off, and the switch K1, the switch K5, the switch K4, the switch K6, and the switch K7 are switched on. The eighth lower bridge arm VT8, the tenth lower bridge arm VT10, the twelfth lower bridge arm VT12, the first upper bridge arm VT1, the third upper bridge arm VT3, and the fifth upper bridge arm VT5 are controlled to be switched on, the second power switch unit, the fourth power switch unit, the sixth power switch unit, the seventh power switch unit, the ninth power switch unit, and the eleventh power switch unit are controlled to be switched off, and a flowing direction of a current of the DC charging and storing circuit is that: the first DC charging and discharging port 3 outputs a direct current, and the direct current flows through the switch K6, the switch K5, one neutral line (led out from the connection point n4) of the second winding unit N2, the second winding unit N2, the eighth lower bridge arm VT8, the tenth lower bridge arm VT10, the twelfth lower bridge arm VT12, and the switch K7 sequentially and flows back to the first DC charging and discharging port 3. Flowing directions of a current of the heating and storing circuit are that: the capacitor C1 outputs a direct current, and the direct current flows through the first upper bridge arm VT1, the third upper bridge arm VT3, the fifth upper bridge arm VT5, the first winding unit N1, one neutral line (led out from the connection point n1) of the first winding unit N1, the switch K4, the switch K5, one neutral line (led out from the connection point n4) of the second winding unit N2, the second winding unit N2, the eighth lower bridge arm VT8, the tenth lower bridge arm VT10, and the twelfth lower bridge arm VT12 sequentially and flows back to the capacitor C1; and the capacitor C1 outputs a direct current, and the direct current flows through the first upper bridge arm VT1, the third upper bridge arm VT3, the fifth upper bridge arm VT5, the first winding unit N1, another neutral line (led out from the connection point n2) of the first winding unit N1, another neutral line (led out from the connection point n3) of the second winding unit N2, the second winding unit N2, the eighth lower bridge arm VT8, the tenth lower bridge arm VT10, and the twelfth lower bridge arm VT12 sequentially and flows back to the capacitor C1.

Figure 15:
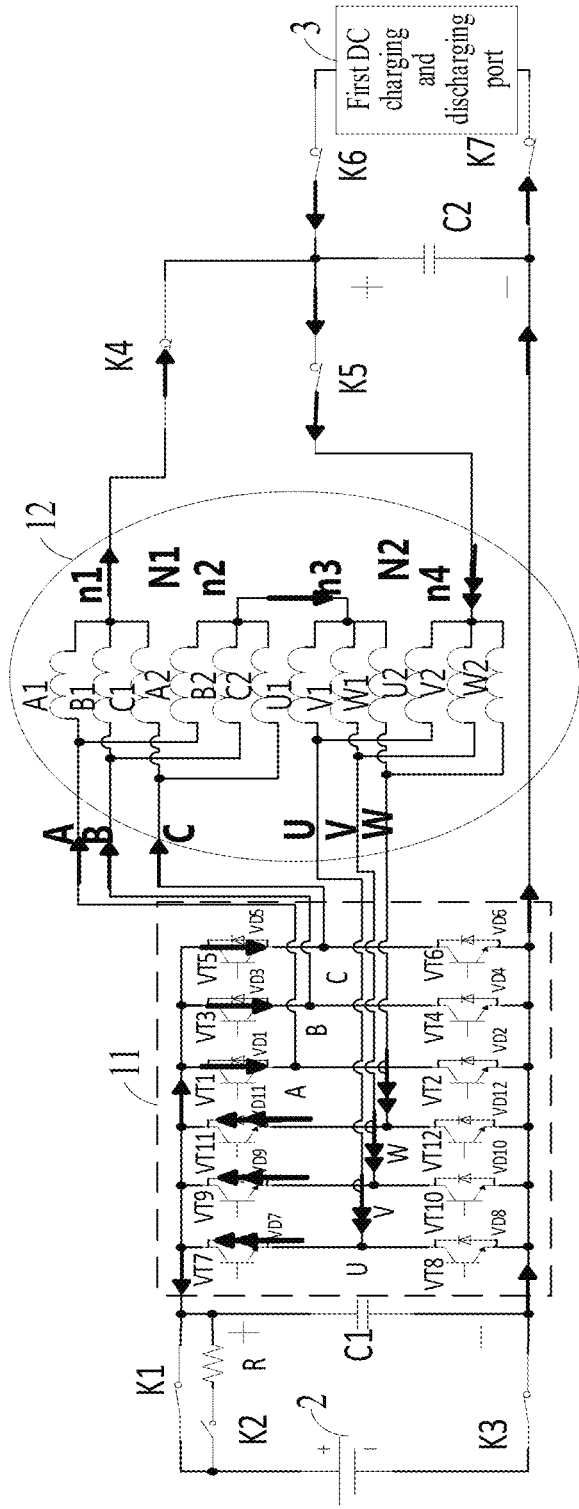
FIG. 15 is a schematic diagram of another flowing direction of a current of an energy conversion device according to a first embodiment of this application.

As shown in FIG. 15, the seventh upper bridge diode VD7, the ninth upper bridge diode VD9, the eleventh upper bridge diode VD11, the first upper bridge arm VT1, the third upper bridge arm VT3, the fifth upper bridge arm VT5 are controlled to be switched on, and the second power switch unit, the fourth power switch unit, the sixth power switch unit, the eighth power switch unit, the tenth power switch unit, and the twelfth power switch unit are controlled to be switched off. A flowing direction of a current of the DC charging and releasing circuit is that: the first DC charging and discharging port 3 outputs a direct current, and the direct current flows through the switch K6, the switch K5, one neutral line (led out from the connection point n4) of the second winding unit N2, the second winding unit N2, the seventh upper bridge diode VD7, the ninth upper bridge diode VD9, the eleventh upper bridge diode VD11, the switch K1, a positive electrode of the battery 2, a negative electrode of the battery 2, the switch K3, and the switch K7 sequentially and flows back to the first DC charging and discharging port 3. Flowing directions of a current of the heating and releasing circuit, namely, flowing directions of a current of stored energy releasing of the first winding unit N1 and the second winding unit N2 are that: the current flows through the first winding unit N1, one neutral line (led out from the connection point n1) of the first winding unit N1, the switch K4, the switch K5, one neutral line (led out from the connection point n4) of the second winding unit N2, the second winding unit N2, the seventh upper bridge diode VD7, the ninth upper bridge diode VD9, the eleventh upper bridge diode VD11, the first upper bridge arm VT1, the third upper bridge arm VT3, and the fifth upper bridge arm VT5 and flows back to the first winding unit N1; and the current flows through the first winding unit N1, another neutral line (led out from the connection point n2) of the first winding unit N1, another neutral line (led out from the connection point n3) of the second winding unit N2, the second winding unit N2, the seventh upper bridge diode VD7, the ninth upper bridge diode VD9, the eleventh upper bridge diode VD11, the first upper bridge arm VT1, the third upper bridge arm VT3, and the fifth upper bridge arm VT5 and flows back to the first winding unit N1.

Figure 16:
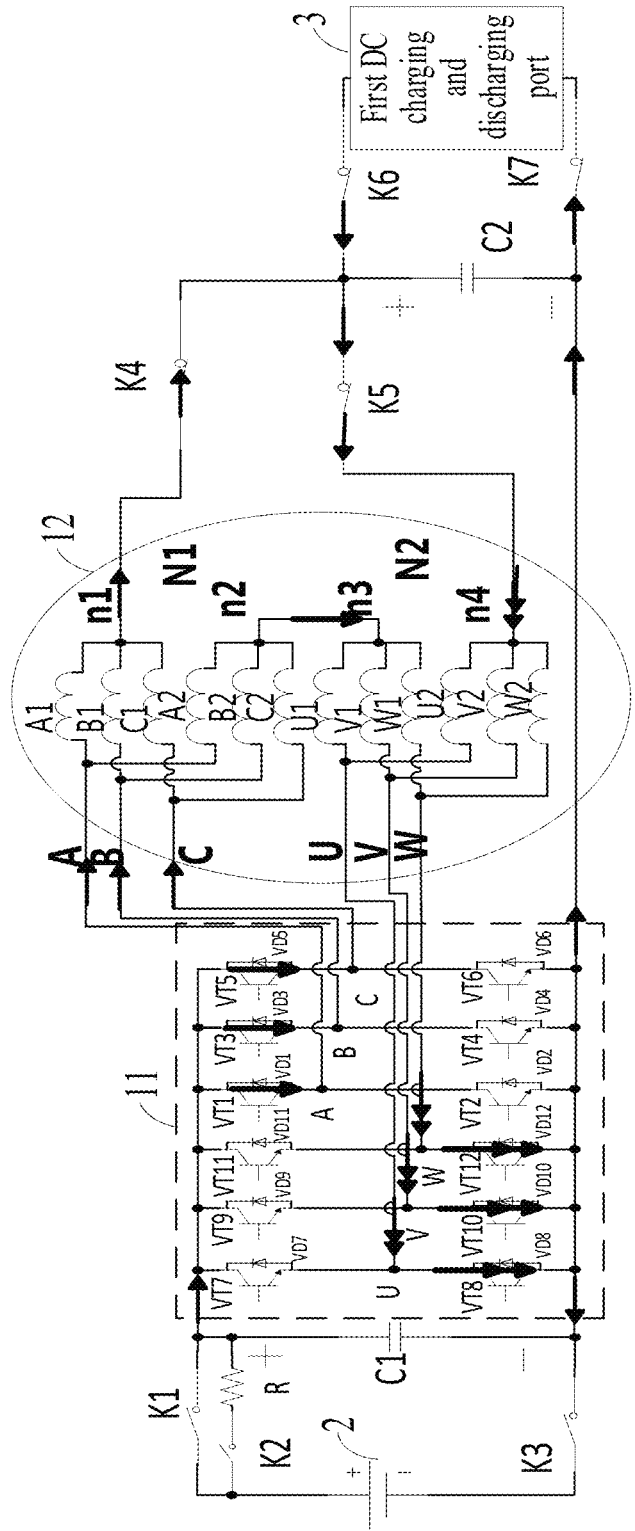
FIG. 16 is a schematic diagram of another flowing direction of a current of an energy conversion device according to a first embodiment of this application.

As shown in FIG. 16, the eighth lower bridge arm VT8, the tenth lower bridge arm VT10, the twelfth lower bridge arm VT12, the first upper bridge arm VT1, the third upper bridge arm VT3, and the fifth upper bridge arm VT5 are controlled to be switched on, the second power switch unit, the fourth power switch unit, the sixth power switch unit, the seventh power switch unit, the ninth power switch unit, and the eleventh power switch unit are controlled to be switched off, and a flowing direction of a current of the DC charging and storing circuit is that: the first DC charging and discharging port 3 outputs a direct current, and the direct current flows through the switch K6, the switch K5, one neutral line (led out from the connection point n4) of the second winding unit N2, the second winding unit N2, the eighth lower bridge arm VT8, the tenth lower bridge arm VT10, the twelfth lower bridge arm VT12, and the switch K7 sequentially and flows back to the first DC charging and discharging port 3. Flowing directions of a current of the heating and storing circuit are that: the capacitor C1 outputs a direct current, and the direct current flows through the first upper bridge arm VT1, the third upper bridge arm VT3, the fifth upper bridge arm VT5, the first winding unit N1, one neutral line (led out from the connection point n1) of the first winding unit N1, the switch K4, the switch K5, one neutral line (led out from the connection point n4) of the second winding unit N2, the second winding unit N2, the eighth lower bridge arm VT8, the tenth lower bridge arm VT10, and the twelfth lower bridge arm VT12 sequentially and flows back to the capacitor C1; and the capacitor C1 outputs a direct current, and the direct current flows through the first upper bridge arm VT1, the third upper bridge arm VT3, the fifth upper bridge arm VT5, the first winding unit N1, another neutral line (led out from the connection point n2) of the first winding unit N1, another neutral line (led out from the connection point n3) of the second winding unit N2, the second winding unit N2, the eighth lower bridge arm VT8, the tenth lower bridge arm VT10, and the twelfth lower bridge arm VT12 sequentially and flows back to the capacitor C1.

Figure 17:
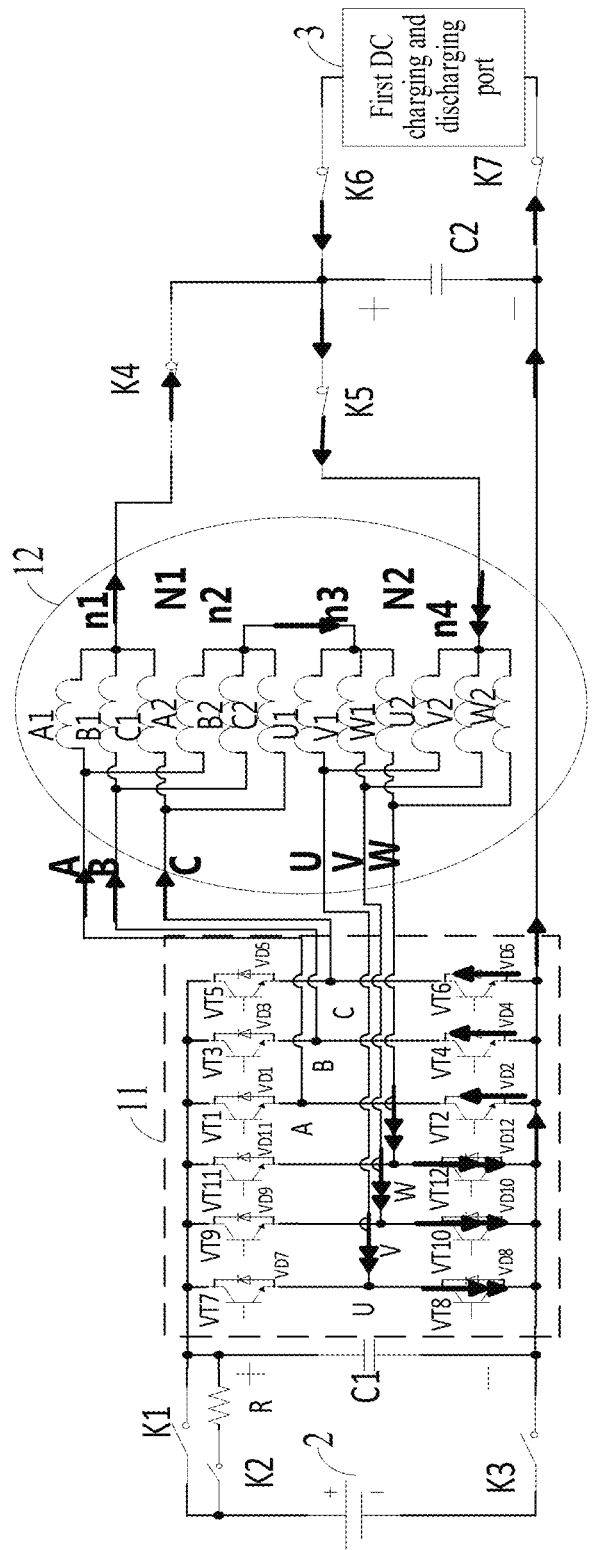
FIG. 17 is a schematic diagram of another flowing direction of a current of an energy conversion device according to a first embodiment of this application.

As shown in FIG. 17, the eighth lower bridge arm VT8, the tenth lower bridge arm VT10, the twelfth lower bridge arm VT12, the second lower bridge diode VD2, the fourth lower bridge diode VD4, and the sixth lower bridge diode VD6 are controlled to be switched on, the seventh power switch unit, the ninth power switch unit, the eleventh power switch unit, the first power switch unit, the third power switch unit, and the fifth power switch unit are controlled to be switched off, and a flowing direction of a current of the DC charging and storing circuit is that: the first DC charging and discharging port 3 outputs a direct current, and the direct current flows through the switch K6, the switch K5, one neutral line (led out from the connection point n4) of the second winding unit N2, the second winding unit N2, the eighth lower bridge arm VT8, the tenth lower bridge arm VT10, the twelfth lower bridge arm VT12, and the switch K7 sequentially and flows back to the first DC charging and discharging port 3. Flowing directions of a current of the heating and releasing circuit, namely, flowing directions of a current of stored energy releasing of the first winding unit N1 and the second winding unit N2 are that: the current flows through the first winding unit N1, one neutral line (led out from the connection point n1) of the first winding unit N1, the switch K4, the switch K5, one neutral line (led out from the connection point n4) of the second winding unit N2, the second winding unit N2, the eighth lower bridge arm VT8, the tenth lower bridge arm VT10, the twelfth lower bridge arm VT12, the second lower bridge diode VD2, the fourth lower bridge diode VD4, and the sixth lower bridge diode VD6 and flows back to the first winding unit N1; and the current flows through the first winding unit N1, another neutral line (led out from the connection point n2) of the first winding unit N1, another neutral line (led out from the connection point n3) of the second winding unit N2, the second winding unit N2, the eighth lower bridge arm VT8, the tenth lower bridge arm VT10, the twelfth lower bridge arm VT12, the second lower bridge diode VD2, the fourth lower bridge diode VD4, and the sixth lower bridge diode VD6 and flows back to the first winding unit N1.

In the foregoing DC charging and heating circuits, the DC charging and storing circuit and the heating and storing circuit in the circuits can work at the same time, and the switches in the energy conversion device do not interfere with each other. Similarly, the DC charging and releasing circuit and the heating and releasing circuit can work at the same time and control switch-on times of the power switches in the reversible PWM rectifier 11. In addition, in the foregoing DC charging and heating circuits, the second winding unit N2 can be used for charging, and the first winding unit N1 and the second winding unit N2 can be used for heating, to meet charging and heating requirements at the same time.

In the schematic diagrams of a flowing direction of a current shown in FIG. 14 to FIG. 17, FIG. 14 shows a flowing direction of a current of a DC charging and storing circuit and a heating and storing circuit; FIG. 15 shows a flowing direction of a current of a DC charging and releasing circuit and a heating and releasing circuit; FIG. 16 shows a flowing direction of a current of a DC charging and storing circuit and a heating and storing circuit; and FIG. 17 shows a flowing direction of a current of a DC charging and storing circuit and a heating and releasing circuit. When the energy conversion device is in a DC charging and storing process, the heating circuit may be in a heating and storing process or a heating and releasing process; and when the energy conversion device is in a DC charging and releasing process, the heating circuit may be in a heating and releasing process. Therefore, processes of the DC charging circuit and the heating circuit may be controlled independently, namely, there should be more than one method for performing heating and DC charging by using the same circuit structure.

The schematic diagram of the circuit structure shown in FIG. 7 is used as an example. In this case, the first DC charging and discharging port 3, the first winding unit N1, the reversible PWM rectifier 11, and the battery 2 form a DC charging and discharging circuit, and the capacitor C1, the reversible PWM rectifier 11, the first winding unit N1, and the second winding unit N2 form a heating circuit.

In the DC charging and discharging circuit formed by the first DC charging and discharging port 3, the first winding unit N1, the reversible PWM rectifier 11, and the battery 2, the first DC charging and discharging port 3, the first winding unit N1, the reversible PWM rectifier 11 form a DC charging and storing circuit, and the first DC charging and discharging port 3, the first winding unit N1, the reversible PWM rectifier 11, and the battery 2 form a DC charging and releasing circuit. The foregoing DC charging and storing circuit completes an energy storage process of the first winding unit N1, the foregoing DC charging and releasing circuit completes a stored energy releasing process of the first winding unit N1, and a boosted direct current is outputted by using the reversible PWM rectifier 11 to charge the battery 2.

In the heating circuit formed by the capacitor C1, the reversible PWM rectifier 11, the first winding unit N1, and the second winding unit N2, the capacitor C1, the reversible PWM rectifier 11, the first winding unit N1, and the second winding unit N2 form a heating and storing circuit, and the first winding unit N1, the second winding unit N2, and the reversible PWM rectifier 11 form a heating and releasing circuit.

Figure 18:
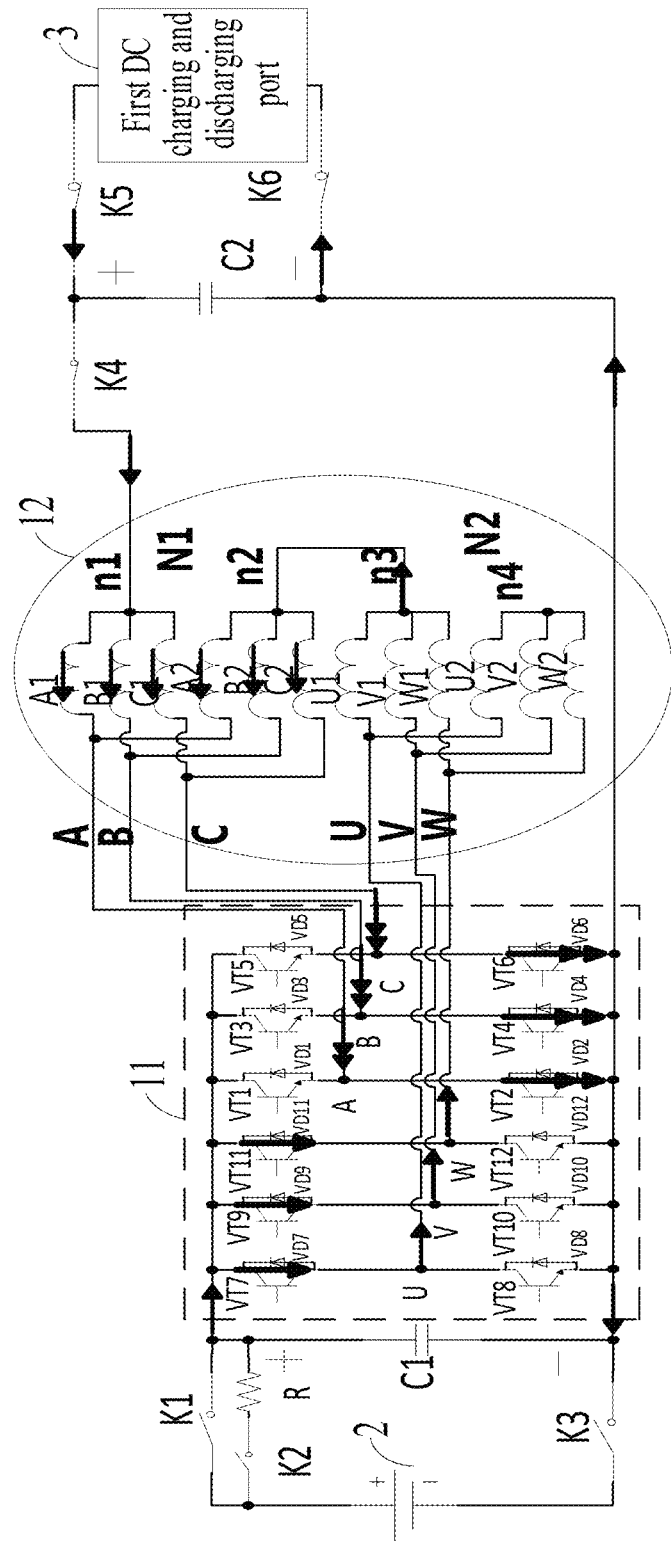
FIG. 18 is a schematic diagram of another flowing direction of a current of an energy conversion device according to a first embodiment of this application.

To understand the foregoing energy storage and energy releasing processes more clearly, a description is made on flowing directions of a current in the foregoing energy storage and energy releasing processes below by using the schematic diagram of the circuit structure shown in FIG. 7 as an example:

As shown in FIG. 18, the switch K1, the switch K5, the switch K4, and the switch K6 are switched off, the switch K2 and the switch K3 are switched on to complete a pre-charging process of the capacitor C1 through the resistor R. The switch K2 is switched off, and the switch K1, the switch K5, the switch K4, and the switch K6 are switched on. The seventh upper bridge arm VT7, the ninth upper bridge arm VT9, the eleventh upper bridge arm VT11, the second lower bridge arm VT2, the fourth lower bridge arm VT4, and the sixth lower bridge arm VT6 are controlled to be switched on, the first power switch unit, the third power switch unit, the fifth power switch unit, the eighth power switch unit, the tenth power switch unit, and the twelfth power switch unit are controlled to be switched off. The first DC charging and discharging port 3 outputs a direct current, and the direct current flows through the switch K5, the switch K4, one neutral line (led out from the connection point n1) of the first winding unit N1, the first winding unit N1, the second lower bridge arm VT2, the fourth lower bridge arm VT4, the sixth lower bridge arm VT6, and the switch K6 sequentially and flows back to the first DC charging and discharging port 3. The capacitor C1 outputs a direct current, and the direct current flows through the seventh upper bridge arm VT7, the ninth upper bridge arm VT9, the eleventh upper bridge arm VT11, the second winding unit N2, one neutral line (led out from n3) of the second winding unit N2, another neutral line (led out from n2) of the first winding unit N1, the first winding unit N1, the second lower bridge arm VT2, the fourth lower bridge arm VT4, and the sixth lower bridge arm VT6 sequentially and flows back to the capacitor C1.

Figure 19:
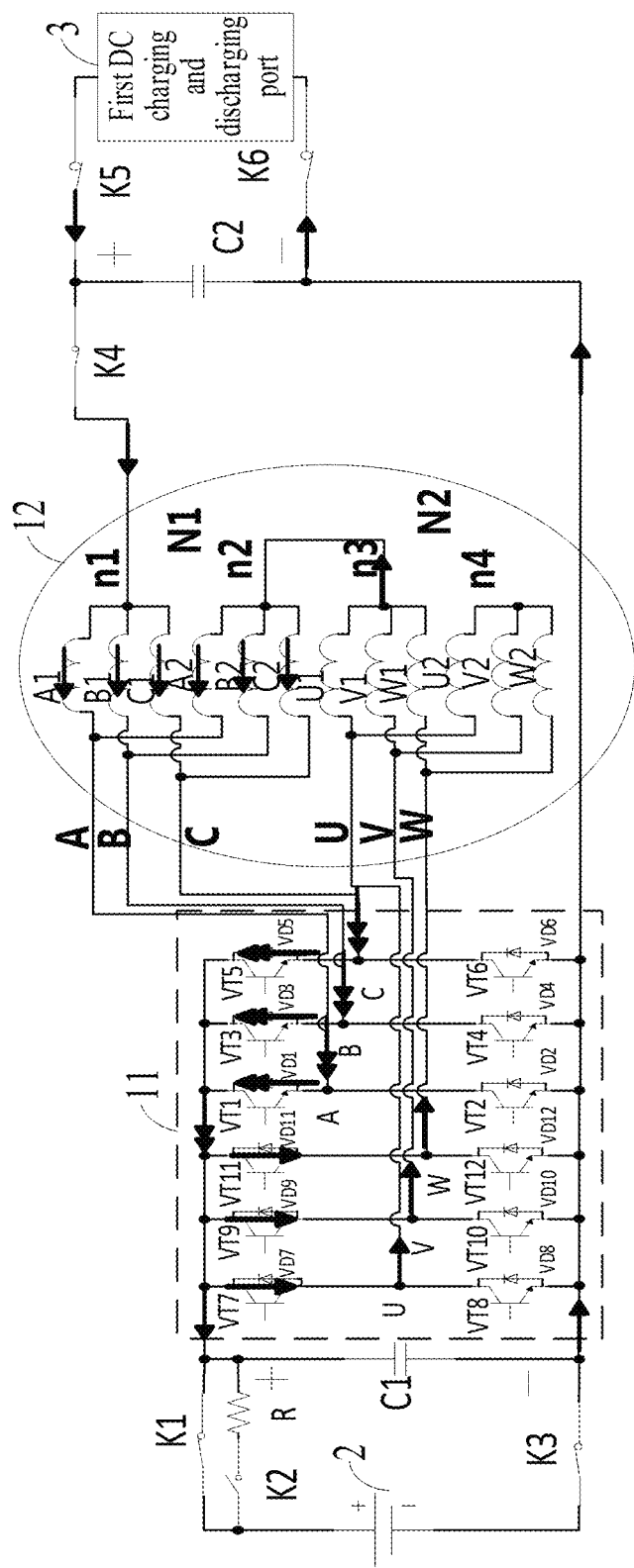
FIG. 19 is a schematic diagram of another flowing direction of a current of an energy conversion device according to a first embodiment of this application.

As shown in FIG. 19, the seventh upper bridge arm VT7, the ninth upper bridge arm VT9, the eleventh upper bridge arm VT11, the first upper bridge diode VD1, the third upper bridge diode VD3, the fifth upper bridge diode VD5 are controlled to be switched on, and the second power switch unit, the fourth power switch unit, the sixth power switch unit, the eighth power switch unit, the tenth power switch unit, and the twelfth power switch unit are controlled to be switched off. The first DC charging and discharging port 3 outputs a direct current, and the direct current flows through the switch K5, the switch K4, one neutral line (led out from n1) of the first winding unit N1, the first winding unit N1, the first upper bridge diode VD1, the third upper bridge diode VD3, the fifth upper bridge diode VD5, the switch K1, the battery 2, the switch K3, and the switch K6 sequentially and flows back to the first DC charging and discharging port 3. A flowing direction of a current of the heating and releasing circuit, namely, a flowing direction of a current of stored energy releasing of the first winding unit N1 and the second winding unit N2 is that: the current flows through the second winding unit N2, one neutral line (led out from n3) of the second winding unit N2, another neutral line (led out from n2) of the first winding unit N1, the first winding unit N1, the first upper bridge diode VD1, the third upper bridge diode VD3, the fifth upper bridge diode VD5, the seventh upper bridge arm VT7, the ninth upper bridge arm VT9, and the eleventh upper bridge arm VT11 and flows back to the second winding unit N2.

Figure 20:
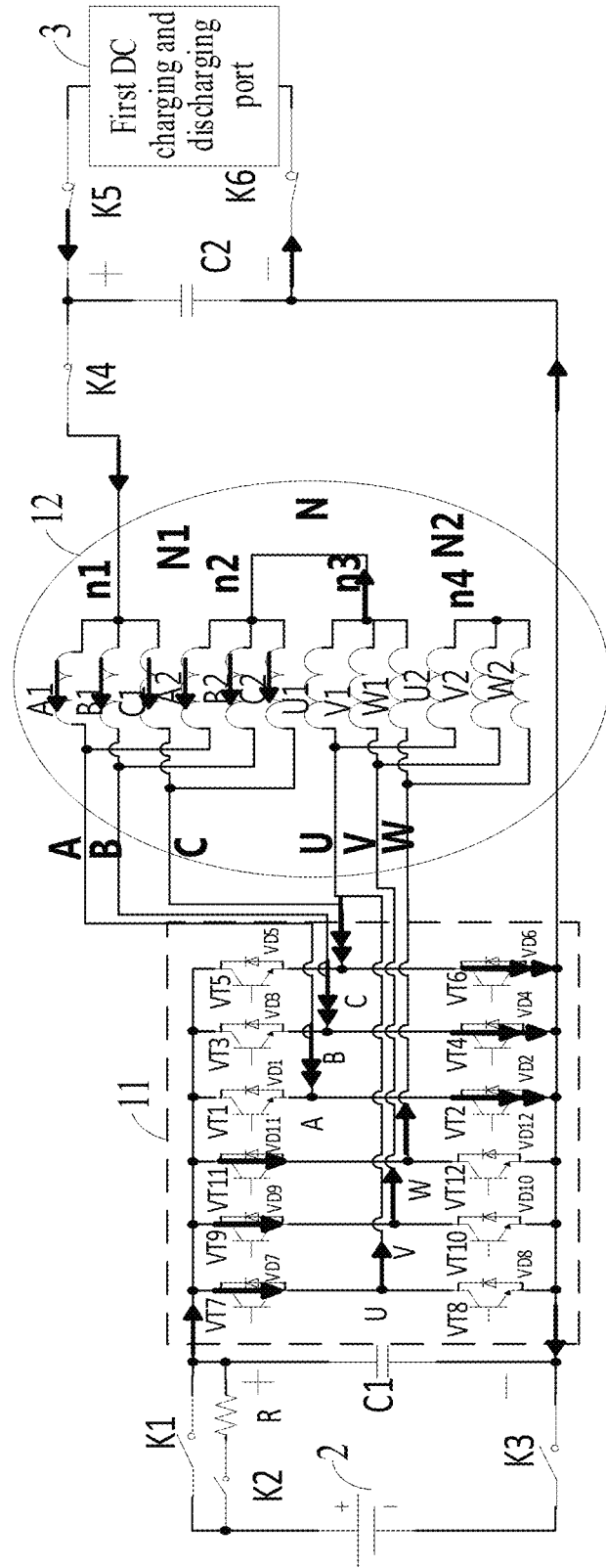
FIG. 20 is a schematic diagram of another flowing direction of a current of an energy conversion device according to a first embodiment of this application.

As shown in FIG. 20, the seventh upper bridge arm VT7, the ninth upper bridge arm VT9, the eleventh upper bridge arm VT11, the second lower bridge arm VT2, the fourth lower bridge arm VT4, and the sixth lower bridge arm VT6 are controlled to be switched on, the first power switch unit, the third power switch unit, the fifth power switch unit, the eighth power switch unit, the tenth power switch unit, and the twelfth power switch unit are controlled to be switched off. The first DC charging and discharging port 3 outputs a direct current, and the direct current flows through the switch K5, the switch K4, one neutral line (led out from n1) of the first winding unit N1, the first winding unit N1, the second lower bridge arm VT2, the fourth lower bridge arm VT4, the sixth lower bridge arm VT6, and the switch K6 sequentially and flows back to the first DC charging and discharging port 3. The capacitor C1 outputs a direct current, and the direct cur rent flows through the seventh upper bridge arm VT7, the ninth upper bridge arm VT9, the eleventh upper bridge arm VT11, the second winding unit N2, one neutral line (led out from n3) of the second winding unit N2, another neutral line (led out from n2) of the first winding unit N1, the first winding unit N1, the second lower bridge arm VT2, the fourth lower bridge arm VT4, and the sixth lower bridge arm VT6 sequentially and flows back to the capacitor C1.

Figure 21:
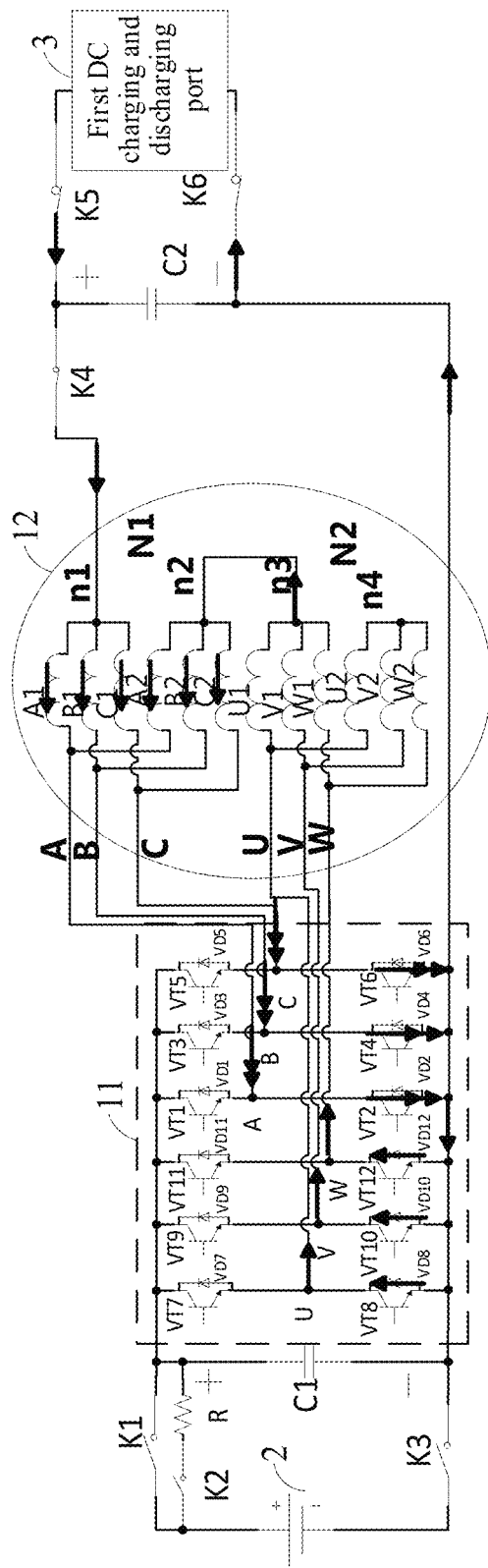
FIG. 21 is a schematic diagram of another flowing direction of a current of an energy conversion device according to a first embodiment of this application.

As shown in FIG. 21, the eighth lower bridge diode VD8, the tenth lower bridge diode VD10, the twelfth lower bridge diode VD12, the second lower bridge arm VT2, the fourth lower bridge arm VT4, and the sixth lower bridge arm VT6 are controlled to be switched on, the seventh power switch unit, the ninth power switch unit, the eleventh power switch unit, the first power switch unit, the third power switch unit, and the fifth power switch unit are controlled to be switched off. The first DC charging and discharging port 3 outputs a direct current, and the direct current flows through the switch K5, the switch K4, one neutral line (led out from n1) of the first winding unit N1, the first winding unit N1, the second lower bridge arm VT2, the fourth lower bridge arm VT4, the sixth lower bridge arm VT6, and the switch K6 sequentially and flows back to the first DC charging and discharging port 3. A flowing direction of a current of the heating and releasing circuit, namely, a flowing direction of a current of stored energy releasing of the first winding unit N1 and the second winding unit N2 is that: the current flows through the second winding unit N2, one neutral line (led out from n3) of the second winding unit N2, another neutral line (led out from n2) of the first winding unit N1, the first winding unit N1, the second lower bridge arm VT2, the fourth lower bridge arm VT4, the sixth lower bridge arm VT6, the eighth lower bridge diode VD8, the tenth lower bridge diode VD10, and the twelfth lower bridge diode VD12 sequentially and flows back to the second winding unit N2.

The schematic diagrams of a flowing direction of a current shown in FIG. 18 to FIG. 21 describes the flowing direction of a current while DC charging and heating are performed at the same time according to the schematic diagram of the circuit structure shown in FIG. 7. It should be noted that, schematic diagrams of other circuit structures provided in this implementation can also perform DC charging and heating at the same time, and a flowing direction of a current thereof is similar to the flowing direction of a current in FIG. 14 to FIG. 17 and FIG. 18 to FIG. 21, so that details are not described herein again.

Further, as an implementation of this embodiment, the controller controls the reversible PWM rectifier 11 according to an external signal, so that a current outputted through the first DC charging and discharging port 3 and the bus capacitor or a current outputted through the battery 2 and the bus capacitor flows through the winding units in the motor coil 12 to generate a torque; controls current vectors formed by a current of each winding unit on a direct axis and a quadrature axis of a synchronous rotating reference frame oriented based on a rotor magnetic field to control a magnitude and a direction of the torque; and controls a magnitude of a current vector formed by a current flowing from all phase windings of each winding unit to all phase windings of another winding unit on a zero axis of the synchronous rotating reference frame oriented based on a rotor magnetic field.

When a current flows through each phase winding in one winding unit, the current is used as a current vector, and the current vector is decomposed in a synchronous rotating reference frame oriented based on a rotor magnetic field, to obtain vectors of the current vector on a direct axis, a quadrature axis, and a zero axis, where a direction of the vector represents a direction of the current, so that vectors corresponding to a current of each phase winding on the direct axis, the quadrature axis, and the zero axis in the synchronous rotating reference frame oriented based on a rotor magnetic field are obtained. Further, a current of each phase winding in one winding unit is resolved on the direct axis, the quadrature axis, and the zero axis in the synchronous rotating reference frame oriented based on a rotor magnetic field, to obtain magnitudes of vectors corresponding to the current of the winding unit on the direct axis, the quadrature axis, and the zero axis.

Similarly, each phase winding in one winding unit include inductance and resistance. When a current flows through, a voltage exists on two ends of each phase winding, and the inductance, the resistance, and the voltage are resolved in the synchronous rotating reference frame oriented based on a rotor magnetic field, to further obtain values of corresponding inductance, resistance, and voltages on the direct axis, the quadrature axis, and the zero axis.

A magnitude and a direction of the torque formed by each winding unit may be calculated according to the following formula (1):

$$T_{ex} = \frac{m_x}{2} P_n [\phi_f i_{qx} + (L_{dx} - L_{qx}) i_{dx} i_{qx}] \tag{1}$$

$T_{ex}$ represents a torque generated by an $x^{th}$ winding unit, $m_x$ represents the number of phases of windings of the $x^{th}$ winding unit, $P_n$ represents the number of pole pairs of the motor, $\varphi_f$ represents a permanent magnetic flux linkage of the motor, $i_{qx}$ represents a current vector of the $x^{th}$ winding unit formed on the quadrature axis, $i_{dx}$ represents a current vector of the $x^{th}$ winding unit formed on the direct axis, $L_{dx}$ represents inductance of the $x^{th}$ winding unit formed on the direct axis, and $L_{qx}$ represents inductance of the $x^{th}$ winding unit formed on the quadrature axis.

A magnitude and a direction of the torque formed by the motor coil may be calculated according to the following formula (2):

$$T_e = \sum_{k=1}^{x} T_{ek} \qquad (2)$$

$T_e$ represents a sum of torques formed by each set of windings, x represents the number of winding units in the motor coil 12, and $T_{ek}$ represents the torque generated by a $k^{th}$ winding unit in the motor coil 12, where k≥1, and k is a positive integer.

It should be noted that, when a current flows through each phase winding, each phase winding should generate heat due to resistance of each phase winding. In this case, heating power is $I^2R$, where I represents the current flowing through windings of a phase, and R represents the resistance of the windings of the phase.

When the motor coil 12 includes x sets of winding units, each winding unit is used as a basic unit, and a similar vector control method is then performed on each winding unit to control each winding unit.

In this implementation, the current, resistance, voltage, and inductance of each winding unit are specifically converted in the synchronous rotating reference frame oriented based on a rotor magnetic field, to obtain components of the current, resistance, voltage, and inductance of each winding unit on the direct axis, the quadrature axis, and the zero axis. By controlling the components corresponding to the current of each winding unit on the direct axis, the quadrature axis, and the zero axis, the torque generated by each winding unit and heating power generated by the motor coil are controlled.

In this implementation, the schematic diagrams of the circuit structures shown in FIG. 2, FIG. 9, FIG. 10, and FIG. 11 are used as an example. In this case, both the first winding unit N1 and the second winding unit N2 lead out two neutral lines, the first winding unit N1 is connected with the second winding unit N2 through neutral lines, and the first DC charging and discharging port 3, the first winding unit N1, the second winding unit N2, the reversible PWM rectifier 11, and the battery 2 form a DC charging and discharging circuit.

In the foregoing DC charging and discharging circuit, a relationship among currents in the circuit may be represented by using the following formula (3):

$i_n = i_{n1} + i_{n2}$ $ia + ib + ic = 3i_{01}$ $iu + iv + iw = 3i_{02}$ $3i_{01} + 3i_{02} + i_n = 0$ $3i_{01} - i + i_{n1} = 0$ $3i_{02} + i + i_{n2} = 0 \qquad (3)$ $i_n$ represents a current flowing into the motor coil 12, $i_{n1}$ represents a current of a neutral line (led out from n1) of the first winding unit N1, $i_{n2}$ represents a current of a neutral line (led out from n4) of the second winding unit N2, is represents a current flowing through windings of a phase A in the first winding unit N1, ib represents a current flowing through windings of a phase B in the first winding unit N1, ic represents a current flowing through windings of a phase C in the first winding unit N1, iu represents a current flowing through windings of a phase U in the second winding unit N2, iv represents a current flowing through windings of a phase V in the second winding unit N2, iw represents a current flowing through windings of a phase W in the second winding unit N2, the numbers of phases m1=m2=3, $i_{01}$ represents a current flowing through each phase winding in the first winding unit N1, $i_{02}$ represents a current flowing through each phase winding in the second winding unit N2, and i represents a current flowing from the first winding unit N1 to the second winding unit N2.

When the energy conversion device works in a DC charging mode, $i_n$ is not equal to zero, and $i_{n1}$ and $i_{n2}$ are both greater than zero; and when the energy conversion device works in a DC discharging mode, $i_n$ is not equal to zero, and $i_{n1}$ and $i_{n2}$ are both less than zero. In this embodiment, a current flowing into the positive electrode of the battery 2 is regarded as a positive current, and the current is greater than zero in this case; and a current flowing out from the positive electrode of the battery 2 is regarded as a negative current, and the current is less than zero in this case.

Specifically, when it is controlled to make $i_{n1}^* = i_n^*/2$, $i_{n2}^* = i_n^*/2$, and i=0, calculation is not performed, and magnitudes of $i_d^*$ and $i_q^*$ are not controlled. $i_n^*$ represents a target current flowing into the motor coil 12, $i_{n1}^*$ represents a target current of the neutral line (led out from n1) of the first winding unit N1, and $i_{n2}^*$ represents a target current of the neutral line (led out from n4) of the second winding unit N2.

In this case, amplitudes of currents outputted by the first winding unit N1 and the second winding unit N2 are equal to each other, so that output power of the two sets of windings may be ensured to be consistent.

Specifically, when it is controlled to make $i_{n1}^* = i_n^*/2 + i$, $i_{n2}^* = i_n^*/2 - i$, and $i = i_n^*/2$, namely, to make $i_{n1}^* = i_n^*$, $i_{n2}^* = 0$, $i_d^* = i_{d1}^* = i_{d2}^* = 0$, $i_q^* = i_{q1}^* = i_{q2}^* = 0$ or $i_{n1}^* = 0$, and $i_{n2}^* = i_n^*$, $i_d^*$ and $i_q^*$ are not resolved and controlled. $i_{d1}^*$ represents a target current vector formed on the direct axis by a current flowing through each phase winding of the first winding unit N1, $i_{q1}^*$ represents a target current vector formed on the quadrature axis by a current flowing through each phase winding of the first winding unit N1, $i_{d2}^*$ represents a target current vector formed on the direct axis by a current flowing through each phase winding of the second winding unit N2, $i_{q2}^*$ represents a target current vector formed on the quadrature axis by a current flowing through each phase winding of the second winding unit N2, $i_d^*$ represents a target current vector formed on the direct axis by a current flowing through all winding units of the motor, and $i_q^*$ represents a target current vector formed on the quadrature axis by a current flowing through all winding units of the motor.

In this case, in the DC charging and discharging circuit, only one of the winding units in the motor coil 12 is used, and working lives of windings may be balanced by using the two sets of windings alternately during each charging and discharging. In addition, a switching loss of an electronic component may be reduced by using only one set of windings thereof every time.

In this implementation, the schematic diagrams of the circuit structures shown in FIG. 7 and FIG. 8 are used as an example. In this case, the first winding unit N1 leads out two neutral lines, the second winding unit N2 leads out one neutral line, the first winding unit N1 is connected with the second winding unit N2 through neutral lines, and the first DC charging and discharging port 3, the first winding unit N1, the second winding unit N2, the reversible PWM rectifier 11, and the battery 2 form a DC charging and discharging circuit.

In the foregoing DC charging and discharging circuit, a relationship among currents in the circuit may be represented by using the following formula (4):

$$ia+ib+ic=3i_{01}$$

$$iu+iv+iw=3i_{02}$$

$$3i_{01}+3i_{02}+i_n=0$$

$$3i_{01}-i+i_{n1}=0$$

$$3i_{02}+i=0 \quad (4)$$

$i_n$ represents a current flowing into the motor coil 12, $i_{n1}$ represents a current flowing from a neutral line (led out from n1) of the first winding unit N1, ia represents a current flowing through windings of a phase A in the first winding unit N1, ib represents a current flowing through windings of a phase B in the first winding unit N1, ic represents a current flowing through windings of a phase C in the first winding unit N1, iu represents a current flowing through windings of a phase U in the second winding unit N2, iv represents a current flowing through windings of a phase V in the second winding unit N2, iw represents a current flowing through windings of a phase W in the second winding unit N2, the numbers of phases m1=m2=3, $i_{01}$ represents a zero axis current flowing through each phase winding in the first winding unit N1, $i_{02}$ represents a zero axis current flowing through each phase winding in the second winding unit N2, and i represents a current flowing from the first winding unit N1 to the second winding unit N2.

Further, as an implementation of this embodiment, a magnitude of a current vector formed on the zero axis by a current flowing through the first winding unit N1 is controlled to be not equal to zero, so that the first DC charging and discharging port 3, one of the winding units in the motor coil 12, the reversible PWM rectifier 11, and the battery 2 form a DC charging circuit or a DC discharging circuit, and the bus capacitor, the reversible PWM rectifier 11, the first winding unit N1, and the second winding unit N2 form a heating circuit.

It should be noted that, in this implementation, each phase winding forms a perpendicular projection corresponding to each phase winding on a direct axis plane and a quadrature axis plane in the synchronous rotating reference frame oriented based on a rotor magnetic field, and a difference between adjacent perpendicular projections is $360/m_x$. When magnitudes of currents flowing through all phase windings in the $x^{th}$ winding unit are equal to each other, the current flowing through each phase winding forms a current vector on the direct axis and the current flowing through each phase winding also forms a current vector on the quadrature axis, and the current vector formed on the direct axis and the current vector also formed on the quadrature axis are added to obtain a sum of current vectors formed on the direct axis and the quadrature axis by the current flowing through each phase winding. In this case, magnitudes of sums of the current vectors formed on the direct axis and the quadrature axis by the current flowing through all phase windings are equal to each other, and a direction difference between sums of current vectors formed on the direct axis and the quadrature axis by a current flowing through windings of adjacent phases is $360/m_x$. Therefore, current vectors formed by each phase winding in the $x^{th}$ winding unit are added, and it may be learned that a sum of the current vectors formed on the direct axis and the quadrature axis of the $x^{th}$ winding unit is zero, namely, the torque generated by the $x^{th}$ winding unit is zero.

In addition, each phase winding in the $x^{th}$ winding unit generates a current vector on the zero axis and directions of currents generated by each phase winding on the zero axis are consistent. Therefore, the current vectors generated on the zero axis of the $x^{th}$ winding unit do not cancel each other, so that a sum of the current vectors generated on the zero axis of the $x^{th}$ winding unit are not zero.

Therefore, when it is controlled to make magnitudes of the currents flowing through all phase windings in the $x^{th}$ winding unit to be equal to each other, the torque generated by the $x^{th}$ winding unit is zero. According to the calculation method in the foregoing formula (2), in this case, Te is zero, no torque is generated, the vehicle should be in a parking state, a current of the motor coil is controlled to charge the battery and heat the battery, and the motor does not rotate.

In this implementation, the sum of the current vectors formed on the direct axis and the quadrature axis of each winding unit is controlled to be zero, so that total torques formed by each winding unit is zero, the motor coil 12 does not generate a torque, and a current vector formed on the zero axis of each winding unit is used to make the motor coil 12 to generate heat to heat the battery 2.

Further, as an implementation of this embodiment, heating power generated by the $x^{th}$ winding unit is $m_x Rs_0 (i_0 x^*)^2$, where $m_x$ represents the number of phases of windings of the $x^{th}$ winding unit, $i_0 x^*$ represents an amplitude of a current vector formed on the zero axis by a current flowing through the $x^{th}$ winding unit, and $Rs_0$ represents a phase resistance of each phase winding branch connected with a neutral line in the $x^{th}$ winding unit.

Specifically, the schematic diagram of the circuit structure shown in FIG. 2 is used as an example. To make torques generated by the motor coil 12 to be zero, current vectors of currents flowing through the first winding unit N1 and the second winding unit N2 on the direct axis and the quadrature axis may be controlled to be zero, or magnitudes of currents of each phase winding in the first winding unit N1 and the second winding unit N2 may be controlled to be equal to each other. In this case, $i_d^* = i_{d1}^* = i_{d2}^* = 0$, and $i_q^* = i_{q1}^* = i_{q2}^* = 0$; or $i_d^*$ and $i_q^*$ are not resolved and controlled.

In this implementation, the schematic diagram of the circuit structure shown in FIG. 2 is used as an example, and heating power of the first winding unit N1, heating power of the second winding unit N2, and heating power of the motor coil 12 may be calculated according to the following formula (5):

$$\begin{cases} P_1 = m_1 R_{sn}(i_{01}^*)^2 = m_1 R_{sn}\left(\dfrac{i_{n1}^*}{m_1}\right)^2 = m_1 R_{sn}\left(\dfrac{\dfrac{i_n^*}{2}+i}{m_1}\right)^2 \\ P_2 = m_2 R_{sn}(i_{02}^*)^2 = m_2 R_{sn}\left(\dfrac{i_{n2}^*}{m_2}\right)^2 = m_2 R_{sn}\left(\dfrac{\dfrac{i_n^*}{2}-i}{m_2}\right)^2 \\ P = P_1 + P_2 = m_1 R_{sn}\left(\dfrac{\dfrac{i_n^*}{2}+i}{m_1}\right)^2 + m_2 R_{sn}\left(\dfrac{\dfrac{i_n^*}{2}-i}{m_2}\right)^2 \\ i_{n1} + i_{n2} = i_n \end{cases} \quad (5)$$

The numbers of phases of the motor m1=m2=3, P represents target heating power of the motor coil, $P_1$ represents target heating power generated by the first winding unit N1 on the zero axis, $P_2$ represents target heating power generated by the second winding unit N2 on the zero axis, and $R_{sn}$ represents a phase resistance of winding branches of each phase connected with a neutral line (in this implementation, the phase resistance of winding branches of each phase connected with a neutral line is equal to each other). It should be noted that, i represents an unbalanced current injected between the first winding unit N1 and the second winding unit N2.

When the energy conversion device works in a DC charging and discharging mode and a heating mode, it is controlled to make $i_n^* = i_{n1}^* + i_{n2}^* \neq 0$ to meet a requirement for charging power, and make $i_{n1}^* = i_n^*/2 + i$, $i_{n2}^* = i_n^*/2 - i$, and i≠0; or make $i_{n1}^* = 2 \cdot i_n^*/3 + i$, $i_{n2}^* = i_n^*/3 - i$, and i≠0, namely, provided that $i_n^* = i_{n1}^* + i_{n2}^* \neq 0$ is met. Meanwhile, it is controlled to make $i_{n1}^* = i_n^*/2 + i$, $i_{n2}^* = i_n^*/2 - i$, and i≠0.

In this implementation, the target heating power that the motor coil 12 needs to generated is obtained according to a temperature of an environment in which the battery 2 is located, the requirement for heating the battery 2 is met by adjusting a magnitude of a current i flowing from all phase windings in each winding unit into all phase windings of another winding unit in the foregoing formula (5), and actual zero axis currents generated by the first winding unit N1 and the second winding unit N2 on the zero axis are obtained according to charging and discharging currents required by the first winding unit N1 and the second winding unit N2. A relationship between the zero axis currents generated by each phase winding in the first winding unit N1 and the second winding unit N2 on the zero axis and a current $i_{n1}$ of a neutral line (led out from n1) of the first winding unit N1 and a current $i_{n2}$ of a neutral line (led out from n4) of the second winding unit N2 is obtained according to the foregoing formula (3), and actual heating power generated by the first winding unit N1 and the second winding unit N2 is calculated according to the foregoing formula (5). When a sum of actual heating power generated by the first winding unit N1 and the second winding unit N2 is greater than or equal to the target heating power, the charging and discharging currents required by the first winding unit N1 and the second winding unit N2 are not adjusted. When a sum of actual heating power generated by the first winding unit N1 and the second winding unit N2 is less than the target heating power, a magnitude of a current i flowing from all phase windings in each winding unit into all phase windings of another winding unit in formula (5) is adjusted. $i_{n1}$, $i_{n2}$, and i are calculated according to formula (5), and requirements of $i_{n1}$, $i_{n2}$, and i are met by controlling currents flowing through the first winding unit N1 and the second winding unit N2 on the zero axis.

In this implementation, the magnitudes of the current vectors formed on the direct axis, the quadrature axis, and the zero axis by the current flowing through each winding unit in the motor coil 12 are controlled, so that the energy conversion device can implement charging and discharging and heat the battery 2 at the same time, to improve the charging and discharging efficiency of the battery 2 and improve the electrical activity of lithium ions in the battery 2, thereby improving the security of the battery 2.

Further, as an implementation of this embodiment, a magnitude of a current vector formed on the zero axis by a current flowing through the first winding unit N1 is controlled to be not equal to zero, and magnitudes of a torque generated by the first winding unit N1 and the second winding unit N2 are the same and not equal to zero, so that the first DC charging and discharging port 3, one of the winding units in the motor coil 12, the reversible PWM rectifier 11, and the battery 2 form a DC charging circuit or a DC discharging circuit, and the bus capacitor, the reversible PWM rectifier 11, and the motor coil 12 form a driving circuit.

The schematic diagram of the circuit structure shown in FIG. 2 is used as an example. In this case, the motor coil 12 includes a first winding unit N1 and a second winding unit N2, the first winding unit N1 and the second winding unit N2 can both generate torques, and the torques generated by the first winding unit N1 and the second winding unit N2 may be obtained according to the foregoing formula (1), which specifically may be calculated according to the following formula (6):

$$\begin{cases} T_e = T_{e1} + T_{e2} = \dfrac{3}{2} P_n [\varphi_f i_q + (L_d - L_q) i_d i_q] \\ T_{e1} = \dfrac{3}{2} P_n [\varphi_f i_{q1} + (L_{d1} - L_{q1}) i_{d1} i_{q1}] \\ T_{e2} = \dfrac{3}{2} P_n [\varphi_f i_{q2} + (L_{d2} - L_{q2}) i_{d2} i_{q2}] \end{cases} \quad (6)$$

The numbers of phases of the motor m1=m2=3, $T_{e1}$ represents a torque generated by the first winding unit N1, $T_{e2}$ represents a torque generated by the second winding unit N2, $i_q$ represents a sum of current vectors of the first winding unit N1 and the second winding unit N2 on the quadrature axis, $i_d$ represents a sum of current vectors of the first winding unit N1 and the second winding unit N2 on the direct axis, $P_n$ represents the number of pole pairs of the motor, $\varphi_f$ represents a permanent magnetic flux linkage of the motor, $i_{q1}$ represents a current vector formed on the quadrature axis by the first winding unit N1, $i_{d1}$ represents a current vector formed on the direct axis by the first winding unit N1, $i_{q1}$ represents a current vector formed on the quadrature axis by the first winding unit N1, $i_{d2}$ represents a current vector formed on the direct axis by the second winding unit N2, $i_{q2}$ represents a current vector formed on the quadrature axis by the second winding unit N2, $L_{d1}$ represents inductance formed on the direct axis by the first winding unit N1, $L_{q1}$ represents inductance formed on the quadrature axis by the first winding unit N1, $L_{d2}$ represents inductance formed on the direct axis by the second winding unit N2, $L_{q2}$ represents inductance formed on the quadrature axis by the second winding unit N2, $L_d$ represents a sum of the inductance formed on the direct axis by the first winding unit N1 and the second winding unit N2, and $L_q$ represents a sum of the inductance formed on the quadrature axis by the first winding unit N1 and the second winding unit N2.

When the first DC charging and discharging port 3, one of the winding units in the motor coil 12, the reversible PWM rectifier 11, and the battery 2 form a DC charging circuit or a DC discharging circuit, and the bus capacitor, the reversible PWM rectifier 11, and the motor coil 12 are caused to form a driving circuit, it is controlled to make $T_e=T_{e1}+T_{e2}$, to make $T_e/2=T_{e1}=T_{e2}$; or $T_{e1}=T_e/2+T$, $T_{e2}=T_e/2-T$, and $T\neq 0$; or $T_{e1}=2*T_e/3+T$, $T_{e2}=1*T_e/3-T$, and $T\neq 0$, namely, provided that $T_e=T_{e1}+T_{e2}$ is met.

Preferably, it is controlled to make $T_e/2=T_{e1}=T_{e2}$, $i_d*=i_{d1}*=i_{d2}*$, and $i_q*=i_{q1}*=i_{q2}*$. In this case, output currents of two sets of winding units in the motor coil 12 are sine currents and have equal amplitudes, so that output power of the two sets of windings may be ensured to be consistent. In addition, bridge arms in the reversible PWM rectifier 11 are used in a balanced manner, so that a service life of the reversible PWM rectifier 11 is prolonged.

Specifically, a target torque of the first winding unit N1 and the second winding unit N2 is obtained based on $T_e=T_{e1}+T_{e2}$ by using the target torque generated by the motor coil 12. Table lookup is performed according to the target torque of the first winding unit N1 to obtain smallest $i_{d1}*$ and $i_{q1}*$, and table lookup is performed according to the target torque of the second winding unit N2 to obtain smallest $i_{d2}*$ and $i_{q2}*$, to obtain the $i_{d1}*$, $i_{q1}*$, $i_{d2}*$, and $i_{q2}*$. The table lookup may be querying current and voltage trace tables in a running process of a built-in permanent magnet synchronous motor, to ensure that the obtained $i_{d1}*$, $i_{q1}*$, $i_{d2}*$, and $i_{q2}*$ are smallest values while a magnitude of the torque is met.

In addition, the charging and discharging currents required by the first winding unit N1 and the second winding unit N2 are obtained, and a current $i_{n1}$ of a neutral line (led out from n1) of the first winding unit N1 and a current $i_{n2}$ of a neutral line (led out from n4) of the second winding unit N2 are obtained according to the required charging and discharging currents and the foregoing formula (3).

In this implementation, charging and discharging and driving may be implemented at the same time, thereby improving the flexibility of applications of the energy conversion device.

Further, as an implementation of this embodiment, a magnitude of a current vector formed on the zero axis by a current flowing through the first winding unit N1 is controlled to be not equal to zero, and magnitudes of the torque generated by the first winding unit N1 and the second winding unit N2 are the same and not equal to zero, so that the first DC charging and discharging port 3, one of the winding units in the motor coil 12, the reversible PWM rectifier 11, and the battery 2 form a DC charging circuit or a DC discharging circuit, and the bus capacitor, the reversible PWM rectifier 11, the first winding unit N1, and the second winding unit N2 form a heating circuit and a driving circuit.

When the first DC charging and discharging port 3, one of the winding units in the motor coil 12, the reversible PWM rectifier 11, and the battery 2 form a DC charging circuit or a DC discharging circuit, and the bus capacitor, the reversible PWM rectifier 11, the first winding unit N1, and the second winding unit N2 form a heating circuit and a driving circuit, the energy conversion device performs charging and discharging, heating, and driving processes at the same time. In this process, heating power generated by an $x^{th}$ winding unit is $$\frac{m}{2} Rs(i_{sx}^*)^2 + mRs_0(i0x^*)^2,$$

where m represents the number of phases of windings of the $x^{th}$ winding unit, i0x* represents an amplitude of a current vector formed on the zero axis by a current flowing through the $x^{th}$ winding unit, Rs represents a phase resistance of each phase winding of the $x^{th}$ winding unit, $Rs_0$ represents a phase resistance of each phase winding branch in the $x^{th}$ winding unit connected with a neutral line, and $i_{sx}*$ represents a sum of current vectors formed on the direct axis and the quadrature axis by the current of the $x^{th}$ winding unit. The schematic diagram of the circuit structure shown in FIG. 2 is used as an example. In this case, Rs represents a phase resistance formed by a winding branch A1 and a winding branch A2 of windings A of a first phase in the first winding unit N1, the phase resistance formed by a winding branch B1 and a winding branch B2 of windings B of a second phase in the first winding unit N1, or the phase resistance formed by a winding branch C1 and a winding branch C2 of windings C of a third phase in the first winding unit N1; and $Rs_0$ represents a phase resistance of the winding branch A1 of the windings A of the first phase in the first winding unit N1, a phase resistance of the winding branch A2 of the windings A of the first phase in the first winding unit N1, a phase resistance of the winding branch B1 of the windings B of the second phase in the first winding unit N1, a phase resistance of the winding branch B2 of the windings B of the second phase in the first winding unit N1, a phase resistance of the winding branch C1 of the windings C of the third phase in the first winding unit N1, or a phase resistance of the winding branch C2 of the windings C of the third phase in the first winding unit N1.

In this case, the current of each winding unit in the motor coil 12 can generate heat on the direct axis, the quadrature axis, and the zero axis. The schematic diagram of the circuit structure shown in FIG. 2 is used as an example, and heating power generated by the first winding unit N1 and the second winding unit N2 may be calculated according to the following formula (7):

$$\begin{cases} P = P_1 + P_2 + P_3 + P_4 \\ P_1 + P_2 = 3R_{sn}(i_{01}^*)^2 + 3R_{sn}(i_{02}^*)^2 = 3R_{sn}\left(\frac{i_{n1}}{3}\right)^2 + 3R_{sn}\left(\frac{i_{n2}}{3}\right)^2 \\ P_1 + P_2 = 3R_{sn}\left(\frac{i_n^*}{2}+i\right)^2 + 3R_{sn}\left(\frac{i_n^*}{2}-i\right)^2 = \frac{R_{sn}}{6}(i_n)^2 + \frac{2R_{sn}}{3}(i)^2 \\ P_3 + P_4 = 3R_s\left[(i_d^*)^2 + (i_q^*)^2\right] = 3R_s(i_s^*)^2 = 1.5R_s\left[(i_{s1}^*)^2 + (i_{s2}^*)^2\right] \\ P_3 = 1.5R_s\left[(i_{d1}^*)^2 + (i_{q1}^*)^2\right] = 1.5R_s(i_{s1}^*)^2 \\ P_4 = 1.5R_s\left[(i_{d2}^*)^2 + (i_{q2}^*)^2\right] = 1.5R_s(i_{s2}^*)^2 \end{cases} \quad (7)$$

$P_1$ represents target heating power generated by the first winding unit N1 on the zero axis, $P_2$ represents target heating power generated by the second winding unit N2 on the zero axis, $P_3$ represents target heating power generated by the first winding unit N1 on the direct axis and the quadrature axis, $P_4$ represents target heating power generated by the second winding unit N2 on the direct axis and the quadrature axis, $i_{s1}*$ represents a sum of current vectors formed on the direct axis and the quadrature axis by a current flowing through the first winding unit N1, $i_{s2}*$ represents a sum of current vectors formed on the direct axis and the quadrature axis by a current flowing through the second winding unit N2, $i_s*$ represents a sum of current vectors formed on the direct axis and the quadrature axis by a current flowing through the first winding unit N1 and the second winding unit N2, $R_s$ represents a phase resistance of each phase winding of the first winding unit N1 and the second winding unit, and $R_{sn}$ represents a phase resistance of winding branches of each phase connected with a neutral line (in this implementation, a phase resistance of winding branches of each phase connected with a neutral line is equal to each other).

Specifically, it is controlled to make $i_n^* = i_{n1}^* + i_{n2}^* \neq 0$, $i_{n1}^* = i_n^*/2 + i$, $i_{n2}^* = i_n^*/2 - i$, and $i \neq 0$; or make $i_{n1}^* = 2*i_n^*/3 + i$, $i_{n2}^* = i_n^*/3 - i$, and $i \neq 0$, namely, provided that $i_n^* = i_{n1}^* i_{n2}^* \neq 0$ is met. Meanwhile, it is controlled to make $i_{n1}^* = i_n^*/2 + i$, $i_{n2}^* = i_n^*/2 - i$, and $i \neq 0$; and it is controlled to make $T_e = T_{e1} + T_{e2}$, to make $T_e/2 = T_{e1} = T_{e2}$; or $T_{e1} = T_e/2 + T$, $T_{e2} = T_e/2 - T$, and $T \neq 0$; or $T_{e1} = 2*T_e/3 + T$, $T_{e2} = 1*T_e/3 - T$, and $T \neq 0$, namely, provided that $T_e = T_{e1} + T_{e2}$ is met.

Preferably, it is controlled to make $T_e/2 = T_{e1} = T_{e2}$, $i_d^* = i_{d1}^* = i_{d2}^*$, and $i_q^* = i_{q1}^* = i_{q2}^*$. In this case, output currents of two sets of winding units in the motor coil 12 are sine currents and have equal amplitudes, so that output power of the two sets of winding units may be ensured to be consistent. In addition, bridge arms in the reversible PWM rectifier 11 are used in a balanced manner, so that a service life of the reversible PWM rectifier 11 is prolonged.

In this embodiment, a current of each winding unit can generate heating power on the zero axis, the quadrature axis, and the direct axis, and control over the heating power may be more flexible.

Further, as an implementation of this embodiment, the reversible PWM 11 rectifier is connected with the controller, the controller obtains an actual current of each phase winding in each winding unit and is further configured to: obtain target heating power that needs to be generated by the motor coil 12; obtain a target zero axis current, a target direct axis current, and a target quadrature axis current required by each winding unit on the direct axis, the quadrature axis, and the zero axis according to the target heating power that needs to be generated by the motor coil 12; and obtain a duty cycle of bridge arms of the reversible PWM rectifier 11 connected with each winding unit according to the target zero axis current, the target direct axis current, the target quadrature axis current, and the actual current flowing through each winding unit, where a total duty cycle of each phase bridge arm is obtained by adding a duty cycle obtained by performing closed-circuit control on a zero axis current of each winding unit to duty cycles of each phase bridge arm obtained by performing vector control on a direct axis current and a quadrature axis current.

In this implementation, the actual current flowing through each phase winding in each winding unit is obtained through acquisition and calculation, heat that needs to be generated by the motor coil 12 is calculated according to a temperature of an environment in which the battery 2 is located and a direct current and a direct voltage outputted by the battery 2, and the target heating power that needs to be generated by the motor coil 12 is obtained according to the heat. The target zero axis current, the target direct axis current, and the target quadrature axis current required by each winding unit on the direct axis, the quadrature axis, and the zero axis are obtained according to the target heating power that needs to be generated by the motor coil 12, and the duty cycle of the bridge arms of the reversible PWM rectifier 11 connected with each winding unit is obtained according to the target zero axis current, the target direct axis current, and the target quadrature axis current, and actual current vectors formed on the direct axis, the quadrature axis, and the zero axis by each winding unit, where the total duty cycle of each phase bridge arm is obtained by adding the duty cycle obtained by performing closed-circuit control on the zero axis current of each winding unit and duty cycles of each phase bridge arm obtained by performing vector control on the direct axis current and the quadrature axis current.

In this implementation, an objective of adjusting the heating power of the motor coil 12 may be achieved by adjusting the duty cycle of the bridge arms of the reversible PWM rectifier 11.

Further, as an implementation of this embodiment, the process of obtaining target heating power that needs to be generated by the motor coil 12, and obtaining a target zero axis current, a target direct axis current, and a target quadrature axis current required by each winding unit on the direct axis, the quadrature axis, and the zero axis according to the target heating power that needs to be generated by the motor coil 12 includes:

obtaining the target heating power that needs to be generated by the motor coil 12 according to a temperature of an environment in which the battery is located;

obtaining the target direct axis current and the target quadrature axis current required by each winding unit on the direct axis and the quadrature axis according to torques that needs to be generated by each winding unit, and obtaining first heating power generated by each winding unit according to the target direct axis current and the target quadrature axis current;

obtaining an actual zero axis current of each winding unit on the zero axis according to a charging and discharging current required by each winding unit, obtaining second heating power generated by each winding unit according to the actual zero axis current generated by each winding unit, and obtaining actual heating power generated by the motor coil 12 by summing the first heating power and the second heating power generated by each winding unit; and when the target heating power that needs to be generated by the motor coil 12 is greater than the actual heating power generated by the motor coil 12, calculating target heating power that needs to be generated by each winding unit on the zero axis according to the actual heating power generated by the motor coil 12 and the target heating power that needs to be generated by the motor coil 12, and calculating the target zero axis current of each winding unit on the zero axis according to the target heating power that needs to be generated by each winding unit on the zero axis.

In some examples, the schematic diagram of the circuit structure shown in FIG. 2 is used as an example. Specifically, torque MTPA&MTPV table lookup is performed according to torque that needs to be generated by each winding unit, to obtain smallest $i_{d1}^*$, $i_{q1}^*$, $i_{d2}^*$, and $i_{q2}^*$. $P_3$ and $P_4$ are calculated according to formula (7), first heating power generated by the motor coil 12 on the direct axis and the quadrature axis is further obtained by adding $P_3$ to $P_4$, and when the first heating power is greater than or equal to the target heating power, the current of each winding unit on the zero axis is no longer adjusted.

When the first heating power is less than the target heating power, the actual zero axis current of each winding unit on the zero axis is obtained according to the charging and discharging current required by each winding unit, the second heating power, namely, a sum of $P_1$ and $P_2$, generated by each winding units is obtained according to the actual zero axis current generated by each winding unit, and the actual heating power generated by the motor coil 12 is obtained by summing the first heating power and the second heating power generated by each winding unit. Specifically, the currents of the first winding unit N1 and the second winding unit N2 on the zero axis are obtained according to formula (3), the second heating power generated by the first winding unit N1 and the second winding unit N2 on the zero axis is obtained according to the currents of the first winding unit N1 and the second winding unit N2 on the zero axis and formula (5), and the first heating power generated by the motor coil 12 on the direct axis and the quadrature axis and the second heating power generated by the first winding unit N1 and the second winding unit N2 on the zero axis are added to obtain the actual heating power of the motor coil 12.

Further, the actual heating power of the motor coil 12 is compared with the target heating power of the motor coil 12. When the target heating power that needs to be generated by the motor coil 12 is greater than the actual heating power generated by the motor coil 12, target heating power, namely, the sum of $P_1$ and $P_2$, that needs to be generated by each set of winding unit on the zero axis is calculated according to the actual heating power generated by the motor coil 12 and the target heating power that needs to be generated by the motor coil 12. Besides, the current $i_{n1}$ of the neutral line (led out from n1) of the first winding unit N1, the current $i_{n2}$ of the neutral line (led out from n4) of the second winding unit N2, and the current i injected between the first winding unit N1 and the second winding unit N2 are obtained according to the target heating power that needs to be generated by each set of winding unit on the zero axis and the calculation method in formula (7), to obtain the target zero axis current of each set of winding unit on the zero axis, and the target direct axis current, the target quadrature axis current, and the target zero axis current are reached by adjusting the currents of each winding unit on the direct axis, the quadrature axis, and the zero axis.

When the target heating power that needs to be generated by the motor coil 12 is less than or equal to the actual heating power generated by the motor coil 12, the magnitude of the current of each winding unit on the zero axis is adjusted, to reduce heat generated by the motor coil 12, thereby ensuring that the heat generated by the motor coil 12 meets the target heating power.

In this implementation, when the energy conversion device works in DC charging and discharging and heating modes, or in DC charging and discharging, heating, and driving modes, the currents of each winding unit on the direct axis, the quadrature axis, and the zero axis may be calculated, to meet requirements for DC charging and discharging and heating or requirements for DC charging and discharging, heating, and driving. So that the energy conversion device can be in a DC charging and discharging state and a heating state at the same time, and can be further in a DC charging and discharging state, a heating state, and a driving state at the same time, to meet requirements of different application scenarios for the energy conversion device.

It should be noted that, the energy conversion device may be alternatively in a driving mode alone. In this case, the battery 2 supplies power and the current of each winding unit on the zero axis is controlled to be zero, and the reversible PWM rectifier 11 converts a direct current into an alternating current to drive the motor.

In addition, the energy conversion device may be alternatively in a heating mode and a driving mode. In this case, the battery 2 supplies power and the current of each winding unit on the zero axis is controlled to be zero, the reversible PWM rectifier 11 converts a direct current into an alternating current to drive the motor, and heating power is generated by using the current of each phase winding in each winding unit on the direct axis and the quadrature axis, to make the motor coil 12 to generate heat; or the current of each winding unit on the zero axis is controlled to not to be zero, the reversible PWM rectifier 11 converts a direct current into an alternating current to drive the motor, and heating power is generated by using the current of each phase winding in each winding unit on the zero axis, to make the motor coil 12 to generate heat; or the current of each winding unit on the zero axis is controlled to not to be zero, the reversible PWM rectifier 11 converts a direct current into an alternating current to drive the motor, heating power is generated by using the current of each phase winding in each winding unit on the zero axis, and heating power is generated by using the current of each phase winding in each winding unit on the direct axis and the quadrature axis, to make the motor coil 12 to generate heat.

In this embodiment, an energy conversion device including a reversible PWM rectifier 11 and a motor coil 12 is used. After the energy conversion device is connected with an external battery 2, a first DC charging and discharging port 3, and a second charging and discharging port 4, the energy conversion device can implement charging and discharging at the same time by using the two charging and discharging ports, and may be further implement charging by using one charging and discharging port and implement discharging by using another charging and discharging port. In addition, the energy conversion device can select one of a heating mode, a heating and driving mode, a heating/driving/charging and discharging mode, a charging and discharging/driving mode, a charging and discharging/heating mode, or a charging and discharging mode to work. A corresponding current vector is formed by a current of each set of winding unit on a synchronous rotating reference frame oriented based on a rotor magnetic field, and torque and heating power of the motor coil 12 are controlled by controlling magnitudes and directions of current vectors on the direct axis, the quadrature axis, and the zero axis, so that the motor coil 12 can generate heating power and/or torque to heat the battery 2, or an external device is used to generate heat to heat the battery, and motor driving may be further implemented, thereby resolving the problems of a complex structure, a low degree of integration, a large volume, and high costs of a battery heating control circuit of an electric vehicle in the related art.

Figure 22:
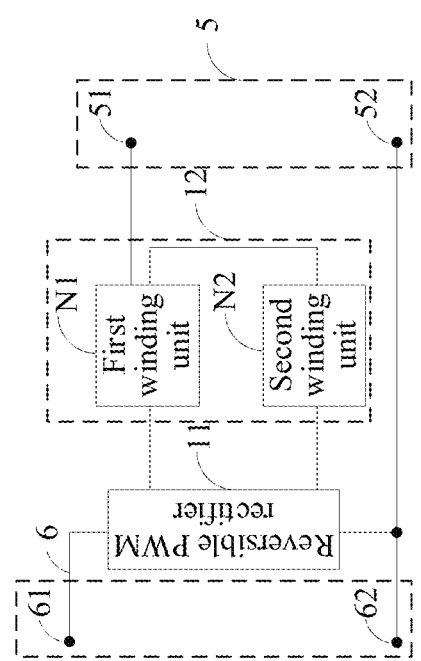
FIG. 22 is a schematic structural diagram of modules of an energy conversion device according to a second embodiment of this application.

As shown in FIG. 22, a second embodiment of this application provides an energy conversion device, including:

a motor coil 12, including at least a first winding unit N1 and a second winding unit N2, where the first winding unit N1 leads out at least one neutral line, the second winding unit N2 leads out at least one neutral line, and the first winding unit N1 is connected with at least one of the neutral lines in the second winding unit N2;

a reversible pulse width modulation (PWM) rectifier 11, connected with the first winding unit N1 and the second winding unit N2 respectively;

a charging and discharging connection end group 5, including a first charging and discharging connection end 51 and a second charging and discharging connection end 52, where at least one neutral line of the at least one winding unit in the motor coil 12 is connected with the first charging and discharging connection end 51, and the second charging and discharging connection end 52 is connected with a second bus terminal of the reversible PWM rectifier 11; and an energy storage connection end group 6, including a first energy storage connection end 61 and a second energy storage connection end 62, where the first energy storage connection end 61 is connected with a first bus terminal of the reversible PWM rectifier 11, and the second energy storage connection end 62 is connected with the second bus terminal of the reversible PWM rectifier 11.

A first end of an external first direct current (DC) charging and discharging port 3 is connected with the first charging and discharging connection end 51, a second end of the first DC charging and discharging port 3 is connected with the second charging and discharging connection end 52, a first end of an external battery 2 is connected with the first energy storage connection end 61, and a second end of the battery 2 is connected with the second energy storage connection end 62. For a specific working manner of this embodiment, reference may be made to the first embodiment of this application, and details are not described herein again.

Further, a third embodiment of this application further provides a vehicle, including the energy conversion device described in the first embodiment of this application or the energy conversion device described in the second embodiment of this application.

For a specific working principle of the energy conversion device in the vehicle of this embodiment, reference may be made to the detailed description of the energy conversion device in the foregoing first embodiment, and details are not described herein again.

Figure 23:
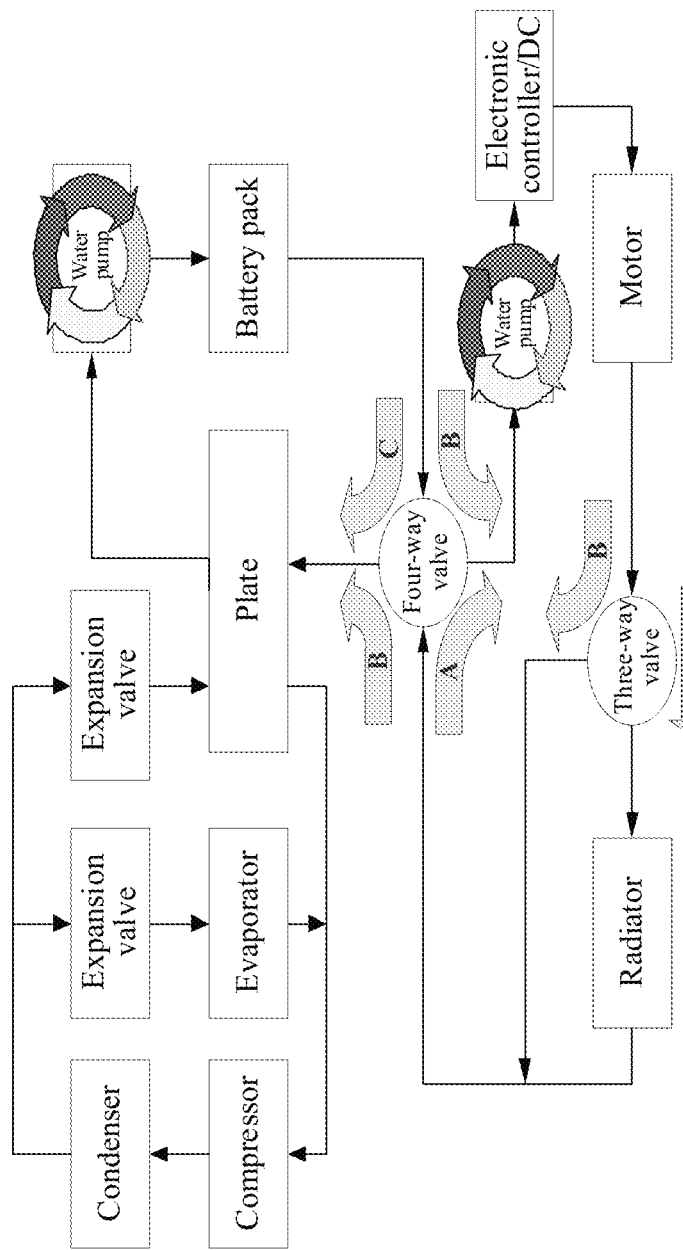
FIG. 23 is a schematic structural diagram of modules of a vehicle according to a third embodiment of this application.

As shown in FIG. 23, a cooling system of a motor drive and a cooling system of a battery pack are in a communication state. Specifically, heating and cooling circuits of the battery pack include the following circuits: a motor driving system cooling circuit, a battery cooling system circuit, and an air-conditioning system cooling circuit. The battery cooling system circuit is integrated with an air-conditioning cooling system through a heat exchanging plate; and the battery cooling system circuit is in communication with the motor driving system cooling circuit through a four-way valve. The motor driving system cooling circuit is connected with or disconnected from a radiator through switching of a three-way valve. The motor driving system cooling circuit and the battery cooling system circuit change a flowing direction of cooling fluid in tubes through valve switching, so that the cooling fluid heated by the motor driving system flows to the battery cooling system, to transfer heat from the motor driving system to the battery cooling system. When the motor driving system works in a non-heating mode, through switching of the three-way valve and the four-way valve, cooling fluid of the motor driving system flows through a circuit A, and cooling fluid of the battery cooling system flows through a circuit C; and when the motor works in a heating mode, through switching of the three-way valve and the four-way valve, the cooling fluid of the motor driving system flows through a circuit B, so that the cooling fluid heated by the motor driving system flows to the battery pack cooling circuit to heat the battery.

In this embodiment, an energy conversion device including a reversible PWM rectifier 11 and a motor coil 12 is used. After the energy conversion device is connected with an external battery 2, and a first DC charging and discharging port 3, the energy conversion device can select one of a heating mode, a heating and driving mode, a heating/driving/charging and discharging mode, a charging and discharging/driving mode, a charging and discharging/heating mode, or a charging and discharging mode to work. A corresponding current vector is formed by a current of each winding unit on a synchronous rotating reference frame oriented based on a rotor magnetic field, and the torque and heating power of the motor coil 12 are controlled by controlling magnitudes and directions of current vectors on the direct axis, the quadrature axis, and the zero axis, so that the motor coil 12 can generate heating power and/or the torque to heat the battery 2, so that devices specifically configured to heat the battery in the related art can be omitted, and motor driving may be further implemented, thereby resolving the problems of a complex structure, a low degree of integration, a large volume, and high costs of a battery heating control circuit of an electric vehicle in the related art.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned device or component must have a particular orientation or must be constructed and operated in a particular orientation. Therefore, such terms should not be construed as limiting of this application.

In addition, the terms "first" and "second" are used merely for the purpose of description, and shall not be construed as indicating or implying relative importance or implying a number of indicated technical features. Therefore, a feature limited by "first" or "second" may explicitly or implicitly include one or more of the features. In the descriptions of this application, "a plurality of" means two or more, unless otherwise definitely and specifically limited.

In this application, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection; a direct connection, an indirect connection through an intermediate, or internal communication between two elements or an interaction relationship between two elements. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of this application. In this specification, schematic descriptions of the foregoing terms are not necessarily directed at the same embodiment or example. Besides, the specific features, the structures, the materials, or the characteristics that are described may be combined in proper manners in any one or more embodiments or examples. In addition, a person skilled in the art may integrate or combine different embodiments or examples described in this specification and features of the different embodiments or examples provided that they are not contradictory to each other.

Although the embodiments of this application are shown and described above, it may be understood that the foregoing embodiments are exemplary, and cannot be understood as a limitation to this application. A person of ordinary skill in the art may make changes, modifications, replacements, and variations to the foregoing embodiments without departing from the scope of this application.

What is claimed is:

1. An energy conversion device, comprising: a reversible pulse width modulation (PWM) rectifier and a motor coil,
   wherein the motor coil comprises at least a first winding unit and a second winding unit, and the first winding unit and the second winding unit are both connected with the reversible PWM rectifier; and
   wherein an external battery, the reversible PWM rectifier, the motor coil, and an external first direct current (DC) charging and discharging port form a first DC charging circuit or a first DC discharging circuit; and the first winding unit leads out at least one first neutral line, the second winding unit leads out at least one second neutral line, and the first winding unit is connected with at least one of the at least one second neutral line of the second winding unit, wherein at least one neutral line of at least one of the winding units is connected with a first end of the external first DC charging and discharging port, the reversible PWM rectifier is connected with a first end of the external battery and a second end of the external battery, respectively, and a second end of the external first DC charging and discharging port is connected with the second end of the external battery.

2. The energy conversion device according to claim 1, wherein
   the reversible PWM rectifier includes one set of M phase bridge arms, first ends of phase bridge arms are connected jointly to form a first bus terminal, second ends of phase bridge arms are connected jointly to form a second bus terminal, the first bus terminal is connected with the first end of the external battery, and the second bus terminal is connected with the second end of the external battery and the second end of the external first DC charging and discharging port;
   the first winding unit of the motor coil comprises one set of $m_1$ phase windings, each phase winding in the $m_1$ phase windings comprises $n_1$ coil branches, the $n_1$ coil branches of each phase winding are connected jointly to form a phase endpoint, phase endpoints of the $m_1$ phase windings are connected with midpoints of each phase bridge arm of $m_1$ phase bridge arms in the M phase bridge arms in a one-to-one correspondence, one coil branch in the $n_1$ coil branches of each phase winding in the $m_1$ phase windings is further respectively connected with one coil branch in the $n_1$ coil branches of other phase windings, to form $n_1$ connection points, $T_1$ neutral points are formed from the $n_1$ connection points, and $J_1$ neutral lines are led out from the $T_1$ neutral points, wherein $n_1 \geq T_1 \geq 1$, $T_1 \geq J_1 \geq 1$, $m_1 \geq 2$, and $n_1$, $m_1$, $T_1$, and $J_1$ are positive integers;
   the second winding unit of the motor coil comprises one set of $m_2$ phase windings, each phase winding in the $m_2$ phase windings comprises $n_2$ coil branches, the $n_2$ coil branches of each phase winding are connected jointly to form a phase endpoint, phase endpoints of the $m_2$ phase windings are connected with midpoints of each phase bridge arm of $m_2$ phase bridge arms in the M phase bridge arms in a one-to-one correspondence, one coil branch in the $n_2$ coil branches of each phase winding in the $m_2$ phase windings is further respectively connected with one coil branch in the $n_2$ coil branches of other phase windings, to form $n_2$ connection points, $T_2$ neutral points are formed from the $n_2$ connection points, and $J_2$ neutral lines are led out from the $T_2$ neutral points, wherein $n_2 \geq T_2 \geq 1$, $T_2 \geq J_2 \geq 1$, $m_2 \geq 2$, $M \geq m_1 + m_2$, and $n_2$, $m_2$, $T_2$, and $J_2$ are positive integers; and
   at least one neutral line in the $J_1$ neutral lines is connected with at least one neutral line in the $J_2$ neutral lines, and at least one neutral line in the $J_1$ neutral lines is connected with the first end of the external first DC charging and discharging port, and/or at least one neutral line in the $J_2$ neutral lines is connected with the first end of the external first DC charging and discharging port.

3. The energy conversion device according to claim 2, wherein when $n_1 \geq T_1 \geq 2$ and $T_1 \geq J_1 \geq 2$, at least one neutral line in the $J_1$ neutral lines is connected with at least one neutral line in the $J_2$ neutral lines, and at least another neutral line in the $J_1$ neutral lines is connected with the first end of the external first DC charging and discharging port.

4. The energy conversion device according to claim 3, wherein when $n_2 \geq T_2 \geq 2$ and $T_2 \geq J_2 \geq 2$, at least another neutral line in the $J_2$ neutral lines is connected with a first end of an external second DC charging and discharging port, and the external second DC charging and discharging port, the motor coil, the reversible PWM rectifier, and the external battery form a second DC charging circuit or a second DC discharging circuit.

5. The energy conversion device according to claim 1, wherein when the external first DC charging and discharging port is connected with a DC power supply device, the DC power supply device, the external first DC charging and discharging port, the first winding unit, the second winding unit, the reversible PWM rectifier, and the external battery form a third DC charging circuit, and wherein the DC power supply device, the external first DC charging and discharging port, the first winding unit, the second winding unit, and the reversible PWM rectifier form a DC charging and storing circuit, and the DC power supply device, the external first DC charging and discharging port, the first winding unit, the second winding unit, the reversible PWM rectifier, and the external battery form a DC charging and releasing circuit.

6. The energy conversion device according to claim 1, wherein when the external first DC charging and discharging port is connected with a DC power consuming device, the external battery, the reversible PWM rectifier, the second winding unit, the first winding unit, the external first DC charging and discharging port, and the DC power consuming device form a third DC discharging circuit, wherein the external battery, the reversible PWM rectifier, the second winding unit, the first winding unit, the external first DC charging and discharging port, and the DC power consuming device form a DC discharging and storing circuit, and the reversible PWM rectifier, the second winding unit, the first winding unit, the external first DC charging and discharging port, and the DC power consuming device form a DC discharging and releasing circuit.

7. The energy conversion device according to claim 1, wherein the energy conversion device further comprises a bus capacitor, and the bus capacitor is connected with the reversible PWM rectifier in parallel, and wherein the external first DC charging and discharging port, one of the winding units in the motor coil, the reversible PWM rectifier, and the external battery form a fourth DC charging circuit or a fourth DC discharging circuit, and the bus capacitor, the reversible PWM rectifier, the first winding unit, and the second winding unit form a heating circuit.

8. The energy conversion device according to claim 7, further comprising a controller, wherein
the external first DC charging and discharging port is connected with a DC power supply device, and
the controller is configured to
control the DC power supply device, the external first DC charging and discharging port, the one of the winding units in the motor coil, and the reversible PWM rectifier to form a charging and storing circuit,
control the DC power supply device, the external first DC charging and discharging port, the one of the winding units in the motor coil, the reversible PWM rectifier, and the external battery to form a charging and releasing circuit,
control the bus capacitor, the reversible PWM rectifier, the one of the winding units in the motor coil, and another winding unit in the motor coil to form a heating and storing circuit, and
control the one of the winding units in the motor coil, the another winding unit in the motor coil, and the reversible PWM rectifier to form a heating and releasing circuit.

9. The energy conversion device according to claim 8, wherein the controller
controls the reversible PWM rectifier according to an external signal, so that a current outputted through the external first DC charging and discharging port and the bus capacitor, or a current outputted through the external battery and the bus capacitor flows through the winding units in the motor coil, to generate a torque;
controls current vectors formed by a current of each winding unit on a direct axis and a quadrature axis of a synchronous rotating reference frame oriented based on a rotor magnetic field to control a magnitude and a direction of the torque; and
controls a magnitude of a current vector formed by a current flowing from all phase windings of each winding unit to all phase windings of another winding unit on a zero axis of the synchronous rotating reference frame oriented based on a rotor magnetic field.

10. The energy conversion device according to claim 9, wherein a magnitude of a current vector formed on the zero axis by a current flowing through the first winding unit is controlled to be not equal to zero, to form the fourth DC charging circuit or the fourth DC discharging circuit and to form the heating circuit; heating power generated by an $x^{th}$ winding unit of the motor coil is $m_x Rs_0(i_0 x^*)^2$, wherein $m_x$ represents a number of phase windings of the $x^{th}$ winding unit, $i_0 x^*$ represents the amplitude of the current vector formed on the zero axis by the current flowing through the $x^{th}$ winding unit, and $Rs_0$ represents a phase resistance of each phase winding branch in the $x^{th}$ winding unit connected with a neutral line.

11. The energy conversion device according to claim 9, wherein a magnitude of a current vector formed on the zero axis by a current flowing through the first winding unit is controlled to be not equal to zero, and magnitudes of a torque generated by the first winding unit and the second winding unit are the same and not equal to zero, to form the fourth DC charging circuit or the fourth DC discharging circuit, and the bus capacitor, the reversible PWM rectifier, and the motor coil form a driving circuit.

12. The energy conversion device according to claim 9, wherein a magnitude of a current vector formed on the zero axis by a current flowing through the first winding unit is controlled to be not equal to zero, and magnitudes of torques generated by the first winding unit and the second winding unit are the same and not equal to zero, to form the fourth DC charging circuit or the fourth DC discharging circuit, and the bus capacitor, the reversible PWM rectifier, the first winding unit, and the second winding unit form the heating circuit and a driving circuit; heating power generated by an $x^{th}$ winding unit of the motor coil is $$\frac{m}{2} Rs(i_{sx}^*)^2 + mRs_0(i0x^*)^2,$$

wherein m represents a number of phase windings of the $x^{th}$ winding unit, i0x* represents an amplitude of a current vector formed on the zero axis by a current flowing through the $x^{th}$ winding unit, Rs represents a phase resistance of each phase winding of the $x^{th}$ winding unit, $Rs_0$ represents a phase resistance of each phase winding branch in the $x^{th}$ winding unit connected with a neutral line, and $i_{sx}$* represents a sum of current vectors formed on the direct axis and the quadrature axis by the current flowing through the $x^{th}$ winding unit.

13. The energy conversion device according to claim 1, wherein the reversible PWM rectifier is connected with a controller, the controller is configured to obtain an actual current of each phase winding in each winding unit; obtain target heating power that needs to be generated by the motor coil; obtain a target zero axis current, a target direct axis current, and a target quadrature axis current required by each winding unit on the direct axis, the quadrature axis, and the zero axis according to the target heating power that needs to be generated by the motor coil; and obtain a duty cycle of bridge arms of the reversible PWM rectifier connected with each winding unit according to the target zero axis current, the target direct axis current, the target quadrature axis current, and the actual current flowing through each winding unit, wherein a total duty cycle of each phase bridge arm is obtained by adding a duty cycle obtained by performing closed-circuit control on a zero axis current of each winding unit to duty cycles of each phase bridge arm obtained by performing vector control on a direct axis current and a quadrature axis current of each winding unit.

14. The energy conversion device according to claim 13, wherein the obtaining target heating power that needs to be generated by the motor coil and obtaining a target zero axis current, a target direct axis current, and a target quadrature axis current required by each winding unit on the direct axis, the quadrature axis, and the zero axis according to the target heating power that needs to be generated by the motor coil comprises:
obtaining the target heating power that needs to be generated by the motor coil according to a temperature of an environment in which the external battery is located;
obtaining the target direct axis current and the target quadrature axis current required by each winding unit on the direct axis and the quadrature axis according to a torque that needs to be generated by each winding unit, and obtaining first heating power generated by each winding unit according to the target direct axis current and the target quadrature axis current;
obtaining an actual zero axis current of each winding unit on the zero axis according to a charging and discharging current required by each winding unit, obtaining second heating power generated by each winding unit according to the actual zero axis current generated by each winding unit, and obtaining actual heating power generated by the motor coil by summing the first heating power and the second heating power generated by each winding unit; and when the target heating power that needs to be generated by the motor coil is greater than the actual heating power generated by the motor coil, calculating target heating power that needs to be generated by each winding unit on the zero axis according to the actual heating power generated by the motor coil and the target heating power that needs to be generated by the motor coil, and calculating the target zero axis current of each winding unit on the zero axis according to the target heating power that needs to be generated by each winding unit on the zero axis.

15. An energy conversion device, comprising:

a motor coil, comprising at least a first winding unit and a second winding unit, wherein the first winding unit leads out at least one first neutral line, the second winding unit leads out at least one second neutral line, and the first winding unit is connected with at least one of the at least one second neutral lines in the second winding unit;

a reversible pulse width modulation (PWM) rectifier, connected with the first winding unit and the second winding unit respectively;

a charging and discharging connection end group, comprising a first charging and discharging connection end and a second charging and discharging connection end, wherein at least one neutral line of the at least one winding unit in the motor coil is connected with the first charging and discharging connection end, and the second charging and discharging connection end is connected with a second bus terminal of a reversible PWM rectifier; and an energy storage connection end group, comprising a first energy storage connection end and a second energy storage connection end, wherein the first energy storage connection end is connected with a first bus terminal of the reversible PWM rectifier, and the second energy storage connection end is connected with the second bus terminal of the reversible PWM rectifier.

16. A vehicle, comprising an energy conversion device, comprising: a reversible pulse width modulation (PWM) rectifier and a motor coil, wherein the motor coil comprises at least a first winding unit and a second winding unit, and the first winding unit and the second winding unit are both connected with the reversible PWM rectifier; and wherein an external battery, the reversible PWM rectifier, the motor coil, and an external first direct current (DC) charging and discharging port form a first DC charging circuit or a first DC discharging circuit and the first winding unit leads out at least one first neutral line, the second winding unit leads out at least one second neutral line, and the first winding unit is connected with at least one of the at least one second neutral lines of the second winding unit, wherein at least one neutral line of at least one of winding units is connected with a first end of the external first DC charging and discharging port, the reversible PWM rectifier is connected with a first end of the external battery and a second end of the external battery, respectively, and a second end of the external first DC charging and discharging port is connected with the second end of the external battery.

17. The device of claim 15, wherein the reversible PWM rectifier includes one set of M phase bridge arms, first ends of phase bridge arms are connected jointly to form the first bus terminal, second ends of phase bridge arms are connected jointly to form the second bus terminal, the first bus terminal is connected with a first end of an external battery, and the second bus terminal is connected with a second end of the external battery and a second end of an external first DC charging and discharging port;

the first winding unit of the motor coil comprises one set of $m_1$ phase windings, each phase winding in the $m_1$ phase windings comprises $n_1$ coil branches, the $n_1$ coil branches of each phase winding are connected jointly to form a phase endpoint, phase endpoints of the $m_1$ phase windings are connected with midpoints of each phase bridge arm of $m_1$ phase bridge arms in the M phase bridge arms in a one-to-one correspondence, one coil branch in the $n_1$ coil branches of each phase winding in the $m_1$ phase windings is further respectively connected with one coil branch in the $n_1$ coil branches of other phase windings, to form $n_1$ connection points, $T_1$ neutral points are formed from the $n_1$ connection points, and $J_1$ neutral lines are led out from the $T_1$ neutral points, wherein $n_1 \geq T_1 \geq 1$, $T_1 \geq J_1 \geq 1$, $m_1 \geq 2$, and $n_1$, $m_1$, $T_1$, and $J_1$ are positive integers;

the second winding unit of the motor coil comprises one set of $m_2$ phase windings, each phase winding in the $m_2$ phase windings comprises $n_2$ coil branches, the $n_2$ coil branches of each phase winding are connected jointly to form a phase endpoint, phase endpoints of the $m_2$ phase windings are connected with midpoints of each phase bridge arm of $m_2$ phase bridge arms in the M phase bridge arms in a one-to-one correspondence, one coil branch in the $n_2$ coil branches of each phase winding in the $m_2$ phase windings is further respectively connected with one coil branch in the $n_2$ coil branches of other phase windings, to form $n_2$ connection points, $T_2$ neutral points are formed from the $n_2$ connection points, and $J_2$ neutral lines are led out from the $T_2$ neutral points, wherein $n_2 \geq T_2 \geq 1$, $T_2 \geq J_2 \geq 1$, $m_2 \geq 2$, $M \geq m_1 + m_2$, and $n_2$, $m_2$, $T_2$, and $J_2$ are positive integers; and at least one neutral line in the $J_1$ neutral lines is connected with at least one neutral line in the $J_2$ neutral lines, and at least one neutral line in the $J_1$ neutral lines is connected with the first end of the external first DC charging and discharging port, and/or at least one neutral line in the $J_2$ neutral lines is connected with the first end of the external first DC charging and discharging port.

18. The device of claim 17, wherein when $n_1 \geq T_1 \geq 2$ and $T_1 \geq J_1 \geq 2$, at least one neutral line in the $J_1$ neutral lines is connected with at least one neutral line in the $J_2$ neutral lines, and at least another neutral line in the $J_1$ neutral lines is connected with the first end of the external first DC charging and discharging port.

19. The device of claim 18, wherein when $n_2 \geq T_2 \geq 2$ and $T_2 \geq J_2 \geq 2$, at least another neutral line in the $J_2$ neutral lines is connected with a first end of an external second DC charging and discharging port, and the external second DC charging and discharging port, the motor coil, the reversible PWM rectifier, and the external battery form a second DC charging circuit or a second DC discharging circuit.

20. The device of claim 17, wherein when the external first DC charging and discharging port is connected with a DC power supply device, the DC power supply device, the external first DC charging and discharging port, the first winding unit, the second winding unit, the reversible PWM rectifier, and the external battery form a third DC charging circuit, and wherein the DC power supply device, the external first DC charging and discharging port, the first winding unit, the second winding unit, and the reversible PWM rectifier form a DC charging and storing circuit, and the DC power supply device, the external first DC charging and discharging port, the first winding unit, the second winding unit, the reversible PWM rectifier, and the external battery form a DC charging and releasing circuit.

* * * * *